(12) United States Patent
Makhija et al.

(10) Patent No.: US 11,714,831 B2
(45) Date of Patent: Aug. 1, 2023

(54) DATA PROCESSING AND CLASSIFICATION

(71) Applicant: NB Ventures, Inc., Clark, NJ (US)

(72) Inventors: Subhash Makhija, Westfield, NJ (US); Santosh Ganesh Dattatraya Bhat, Wadala East (IN); Nishanth Koganti, Hyderabad (IN); Venkata Sri Harsha Vemuluru, Hyderabad (IN); Vikash Prasad, Thane West (IN)

(73) Assignee: NB VENTURES, INC., Clark, NJ (US)

(*) Notice: Subject to any disclaimer, the term of this patent is extended or adjusted under 35 U.S.C. 154(b) by 682 days.

(21) Appl. No.: 16/714,947

(22) Filed: Dec. 16, 2019

(65) Prior Publication Data

US 2021/0182659 A1    Jun. 17, 2021

(51) Int. Cl.
| | |
|---|---|
| *G06F 16/28* | (2019.01) |
| *G06F 16/23* | (2019.01) |
| *G06F 16/21* | (2019.01) |
| *G06F 16/25* | (2019.01) |
| *G06N 3/08* | (2023.01) |
| *G06N 3/04* | (2023.01) |
| *G06F 18/21* | (2023.01) |
| *G06V 30/146* | (2022.01) |
| *G06V 30/40* | (2022.01) |
| *G06V 30/19* | (2022.01) |
| *G06V 10/82* | (2022.01) |
| *G06V 30/10* | (2022.01) |

(52) U.S. Cl.
CPC .......... *G06F 16/285* (2019.01); *G06F 16/212* (2019.01); *G06F 16/2379* (2019.01); *G06F 16/2393* (2019.01); *G06F 16/258* (2019.01); *G06F 16/288* (2019.01); *G06F 18/217* (2023.01); *G06N 3/04* (2013.01); *G06N 3/08* (2013.01); *G06V 10/82* (2022.01); *G06V 30/147* (2022.01); *G06V 30/1916* (2022.01); *G06V 30/19147* (2022.01); *G06V 30/19173* (2022.01); *G06V 30/40* (2022.01); *G06V 30/10* (2022.01); *G06V 2201/09* (2022.01)

(58) Field of Classification Search
None
See application file for complete search history.

(56) References Cited

U.S. PATENT DOCUMENTS

| | | | |
|---|---|---|---|
| 8,239,335 B2 | 8/2012 | Schmidtler et al. | |
| 9,665,628 B1 | 5/2017 | Dubey et al. | |
| 10,438,133 B2 | 10/2019 | Vachhani et al. | |
| 10,599,635 B1* | 3/2020 | Gunn | G06F 16/213 |
| 11,176,443 B1* | 11/2021 | Selva | G06N 3/0454 |
| 2018/0053115 A1* | 2/2018 | Vachhani | G06Q 30/0204 |

(Continued)

OTHER PUBLICATIONS

Weber et al., "Using Supervised Learning to Classify Metadata of Research Data by Discipline of Research", Oct. 2019; (Year: 2019).*

*Primary Examiner* — Dawaune A Conyers
(74) *Attorney, Agent, or Firm* — Brownwinick Law Firm; David Breiner

(57) ABSTRACT

The present invention discloses a method, a system and a computer program product for data processing and classification. The invention provides warm start and cold start classification tools for classification of data obtained from known or unknown entities. The system and method are also configured to be employed over blockchain based networks.

33 Claims, 19 Drawing Sheets

(56) References Cited

U.S. PATENT DOCUMENTS

| | | | |
|---|---|---|---|
| 2018/0268079 A1* | 9/2018 | Das | G06F 16/90335 |
| 2019/0114391 A1* | 4/2019 | Jaganathan | G16B 40/20 |
| 2020/0019561 A1* | 1/2020 | Doyle | G06F 16/287 |
| 2020/0349434 A1* | 11/2020 | Zhang | G06N 3/0427 |
| 2021/0027054 A1* | 1/2021 | Bhatnagar | G06V 30/416 |

* cited by examiner

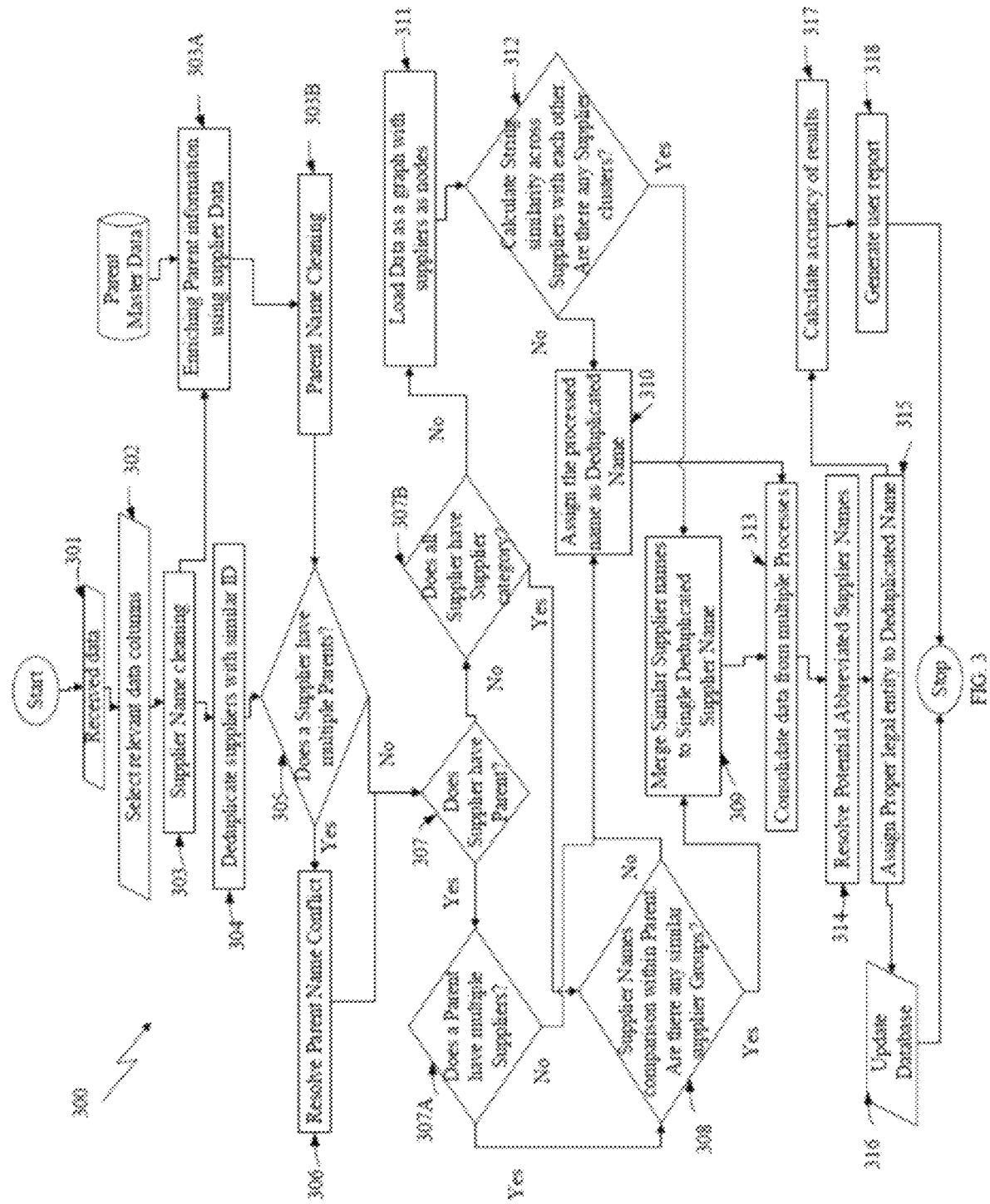

FIG. 3A

| SUPPLIER NAME | OTHER INPUT COLUMNS | ACCURACY | DEDUPLICATED CHILD NAME | COUNT | ENRICHED PARENT NAME |
|---|---|---|---|---|---|
| XYZ INC. | | 100% | XYZ INC | 3 | XYZ |
| XYZ | | 98% | XYZ INC | 3 | XYZ |
| XYZ AMERICA LLC | | 94% | XYZ INC | 3 | XYZ |

| INPUT SUPPLIER NAME | DEDUPED SUPPLIER NAME |
|---|---|
| XYZ USA INC | XYZ INC |
| XYZ | XYZ INC |
| XYZ INC | XYZ INC |
| XYZ LLC | XYZ INC |

| INPUT SUPPLIER NAME | DEDUPED SUPPLIER NAME |
|---|---|
| XYZ HEALTH & BENEFITS | XYZ HEALTH AND BENEFITS LLC |
| XYZ HEALTH AND BENEFITS LLC | XYZ HEALTH AND BENEFITS LLC |
| XYZ TECHNOLOGY LLC | XYZ TECHNOLOGY LLC |
| XYZ TECHNOLOGY LLC | XYZ TECHNOLOGY LLC |
| XY/XYZ MOVERS | XYZ PACKERS MOVERS |
| XYZ PACKERS MOVERS | XYZ PACKERS MOVERS |

300C

300D

| INPUT SUPPLIER NAME | DEDUPED SUPPLIER NAME |
|---|---|
| XYZ | X AND Y AND Z |
| X AND Y AND Z | X AND Y AND Z |
| XYZTC | XYZ TOBACCO COMPANY |
| XYZ TOBACCO COMPANY | XYZ TOBACCO COMPANY |
| XYZ CONSULTING GROUP LLC | XYZ CONSULTING GROUP LLC |
| XYZCG MANAGEMENT CONSULTANTS | XYZ CONSULTING GROUP LLC |

| INPUT SUPPLIER NAME | DEDUPED SUPPLIER NAME |
|---|---|
| XYZ | XYZ INC |
| YZ | XYZ INC |
| XYZ (ASHEVILLE) | XYZ INC |
| YZ COMPANY LLC | XYZ INC |
| X Y TECHNOLOGIES | XYZ INC |
| UNIVERSITY OF XYZ AT ABC | UNIVERSITY OF XYZ |
| UNIVERSITY OF ILLINOIS | UNIVERSITY OF XYZ |
| XYZ RAIL SERVICES CORPORATION | XYZ RAIL SERVICES CORP LTD |
| XYZ RAIL SERVICES CORP LTD | XYZ RAIL SERVICES CORP LTD |

| INPUT SUPPLIER NAME | DEDUPED SUPPLIER NAME |
|---|---|
| XYZ | XYZ LIMITED |
| XYZ LIMITED | XYZ LIMITED |
| XYZ TECHNOLOGY LLC | XYZ TECHNOLOGY LLC |
| XYZ | XYZ TECHNOLOGY LLC |
| XYZ | XYZ GROUP LTD |
| XYZ GLOBAL TECHNOLOGY | XYZ GROUP LTD |
| XYZ GROUP LTD | XYZ GROUP LTD |

FIG. 3F

| S.No | General Ledger Description | Invoice Description | Material Description |
|---|---|---|---|
| 1 | Minor machinery and equipment | VABF-S41-R1C2-C-6 Regulator Plate | Maintenance parts and supplies: Pneumatic Parts |
| 2 | Capital Expenditure to Project | 10inch Clevis hanger | Plant, property and equipment: Extrusion equipment |
| 3 | Capital Expenditure to Project | Steel for greige roll gravity racks | Plant, property and equipment: Tire racks |
| 4 | Factory Supplies | TK464966OT 0-6 range stainless steel Inc | Maintenance parts and supplies: General industrial supplies |
| 5 | Outside Contracts for R&M | Insitute piping in millroom | Contractors and services: General maintenance contractors |

FIG. 6A

600A

| ID | Supplier Name | Country | Region |
|---|---|---|---|
| 1 | XYZ Industries Inc | United States of America | Americas |
| 2 | XYZ International Inc | United States of America | Americas |
| 3 | XYZ International Inc | United States of America | Americas |
| 4 | ABC Inc | United States of America | Americas |
| 5 | ABC Enterprises Inc | United States of America | Americas |

FIG. 6B

600B

| ID | Level 1 | Level 2 | Level 3 | Level 4 |
|---|---|---|---|---|
| 1 | MRO | MRO Supplies | Electrical | Regulators/ Converters/ Inverters |
| 2 | MRO | MRO Supplies | Industrial Supplies | Metal Products |
| 3 | MRO | MRO Supplies | Industrial Supplies | Metal Products |
| 4 | MRO | MRO Supplies | Industrial Supplies | Other Industrial Supplies |
| 5 | MRO | MRO Supplies | Power Transmission and Bearing | Gears/ Gear Units/ Reducers |

FIG. 6C

600C

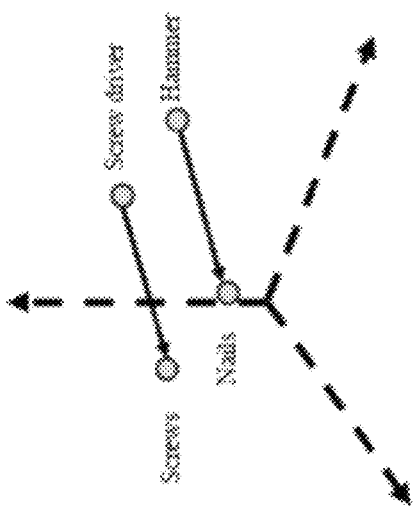
FIG. 8B
FIG. 8C

DATA PROCESSING AND CLASSIFICATION

BACKGROUND

1. Technical Field

The present invention relates generally to data processing. More particularly, the invention relates to systems, methods and computer program product for data processing and classification.

2. Description of the Prior Art

Data processing for analysis of expenditures, savings and profits are significant factors for growth of any organization. The accurate analysis of data can help in taking measures for reducing expenditures, maximizing savings, making key business decisions etc.

Data is obtained from several sources within an enterprise. For eg; an enterprise application may obtain data like Spend data from several sources within the supply chain lifecycle like purchase orders (PO) and invoices where a line item in the PO or invoice corresponds to one sample. Another source for spend data could be from the General Ledger (GL) which is maintained by the accounting team. Each sample thus has several attributes obtained from different sources. These attributes for e.g., can be the supplier name, PO description, GL description, invoice description and materials descriptions etc.

Data needs to be classified into particular categories to enable company level data analysis and for application like cost cutting decisions. In most organizations, goods and services are procured from various service providers and it becomes tedious to get insights from the spend data.

Various challenges are faced in classification of data due to the characteristic of such data, like spend data are huge in volume, the transactions have very less information about the services procured from a vendor/service provider, absence of vendor name in the transactional records, absence of invoice description, purchase order description, material description, general ledger account information, redundant transactions in the data and inconsistencies in data occurred at the time of data entry.

Also, the data extracted through documents that are not supportive for identification of text data are highly inaccurate. For eg, any image data containing text data that needs to be extracted and then classified leads to multiple problems including but not limited to transcription errors etc., thereby presenting more challenges than normal text classification.

Moreover, it is extremely difficult to classify data in case it is coming from a new source. The limitations of processing capabilities of a computing system with respect to new or unknown data is extremely high in case of data classification. Data classification done on basis of erroneous information leads to inaccurate results.

Further, in case of blockchain networks the implementation of any classification is extremely difficult due to varying nature of data in each block. The structure of a blockchain network inherently makes it extremely difficult to perform classification of data present over a distributed network. Moreover, to build a classification mechanism which would work across different types of network including centralized and distributed is extremely difficult.

There are prevailing arts on data classification such as U.S. Pat. No. 9,665,628B1 titled "Systems and/or methods for automatically classifying and enriching data records imported from big data and/or other sources to help ensure data integrity and consistency". However, none of the existing prior arts provide classification of data with higher accuracy. Also, the existing arts do not provide a solution in case there are inaccurate data imported from documents that are not in text form.

Accordingly, there is a need in the art for improved systems and methods of data processing and classification in Enterprise application (EA) and Supply chain management (SCM) applications.

SUMMARY

In an embodiment the present invention discloses a method of data processing and classification. The method includes the steps of receiving a data from an entity at a server; cleansing and enriching the received data and storing the cleansed enriched data in an operational database; in response to determination of the cleansed enriched data as a new entity data, initiating a stratified sampling of the cleansed enriched data for obtaining at least one data subset from the cleansed enriched data; generating a reference data from the at least one data subset by annotation through an AI engine coupled to a processor wherein an annotation script configured to process the at least one data subset generates the reference data based on a dynamic processing logic; training an entity specific data model by applying transfer learning to a historical data model using the reference data; creating a classification data matrix from the cleansed enriched data, and applying the entity specific data model to the classification data matrix for classifying the cleansed enriched data and providing a confidence score of the classified data.

In a related embodiment, the step of cleansing and enrichment of the received data includes determining characteristic of the received data and verifying a historical database for identifying at least one related data for the received data; in response to identification of the at least one related data, determining if the related data is a cleansed data wherein the received data is recharacterized based on the related data if the related data is a cleansed data; initiating a data cleansing and normalization operation on an identified dataset if the related data is not a cleansed data wherein the identified dataset includes the at least one related data of the historical database and the received data; in response to initiation of the operation, identifying a plurality of data cleansing models from a data cleansing model database for cleansing of the dataset; and creating at least one data model switching script by a bot based on the dataset, the identified data cleansing models and AI based processing logic for cleansing of the received data.

In an embodiment, the present invention provides a system for data processing and classification. The system includes a server configured to receive a data from an entity. The server includes at least one data store having a plurality of databases including an operational database for storing the received data after cleansing and enrichment. The data store also includes at least one training model database for storing a historical data classification model. The system further includes a verification engine for checking if the received data is a new entity data and a processor configured to select a classification tool for generating a classified data with a confidence score in response to determination of the cleansed enriched data as a new entity data. The data classification tool is configured to initiate a stratified sampling of the cleansed enriched data for obtaining at least one data subset from the cleansed enriched data, generate a reference data from the at least one data subset by annotation through an AI engine wherein an annotation script is configured to process the at least one data subset and generates the reference data based on a dynamic processing logic, and train an entity specific data model by applying transfer learning to a historical data model using the reference data wherein the AI engine is configured to create a data matrix from the cleansed enriched data, and the entity specific data model is applied to the data matrix for classifying the cleansed enriched data and provide the confidence score of the classified data.

In a related embodiment, for data cleansing and enrichment the system further includes a related data verification engine configured to determine characteristics of the received data and verify a historical database for identifying at least one related data for the received data based on the characteristics. The system also includes a sub-processor configured to process the received data, the identified related data for determining if the related data is a cleansed data and recharacterize the received data based on the related data; a controller encoded with instructions enabling the controller to function as a bot for initiating a data cleansing and normalization operation on an identified dataset if the related data is not a cleansed data wherein the identified dataset includes the at least one related data of the historical database and the received data; and a cleansing data model database for storing a plurality of data models configured to clean the dataset, wherein at least one data model switching script is created by the bot based on the dataset, the plurality of data models and AI based processing logic for cleansing of the dataset wherein the data model switching script is configured to recharacterize the dataset and re-calibrate a plurality of functions of at least one application deploying the recharacterized datasets.

In an embodiment, the present invention provides a computer program product for data processing and classification using multiple integrated tools configured for generating classified data with confidence score. The product includes a computer readable storage medium readable by a processor and storing instructions for execution by the processor for performing the method of data classification.

In an advantageous aspect, the present invention utilizes Machine Learning algorithms and advanced AI based annotation techniques through a script in the pre-classified data to determine 'reference data' which helps in categorization of new and un-categorized spend data.

In another embodiment, the invention provides a blockchain based data processing and classification system. The system includes a plurality of linked data blocks forming a blockchain with multiple branches configured for storing data from distinct entities; an AI based processing node configured for storing a dynamically updated blockchain based historical data model wherein the historical data model is reconfigured each time a data learning is transferred to the model from a sub-data model of each of the plurality of linked data blocks; an element connected to each of the linked data block configured for receiving the dynamically updated blockchain based historical data model for cleansing and enrichment of the stored data in each of the linked blocks.

In an embodiment the present invention provides a blockchain based data processing and classification method. The method includes adding the entity as a new block of a blockchain network wherein the blockchain network includes a plurality of linked data blocks with multiple branches configured for storing data from distinct entities.

BRIEF DESCRIPTION OF THE DRAWINGS

The disclosure will be better understood and when consideration is given to the drawings and the detailed description which follows. Such description makes reference to the annexed drawings wherein:

FIG. 3A-3F are examples showing deduplication of data as part of data cleansing in accordance with an embodiment of the invention.

FIG. 5 shows extraction of data through OCR for classification in accordance with an embodiment of the invention.

FIG. 6A shows a table with example descriptions obtained from different sources used as input to perform classification in accordance with an embodiment of the invention.

FIG. 6B shows a table with example supplier names, countries and regions also used as auxiliary input to the classification in accordance with an embodiment of the invention.

FIG. 6C shows a table with examples showing Level 1 to Level 4 labels within normalized taxonomy for items in a manufacturing industry in accordance with an embodiment of the invention.

FIG. 8B shows an intuitive diagram of word embeddings where the semantic relationship of a screwdriver is to screws as hammer is to nails is encoded in the embedding space in the form of similar vectors as an example in accordance with an embodiment of the invention.

FIG. 8C shows an example of word embedding vectors mapped onto a two-dimensional space where words that are closest to the target word "Plumbing" are relevant words for example "XYZ" is a supplier that handles plumbing related equipment, in accordance with an embodiment of the invention.

DETAILED DESCRIPTION

Figure 1:
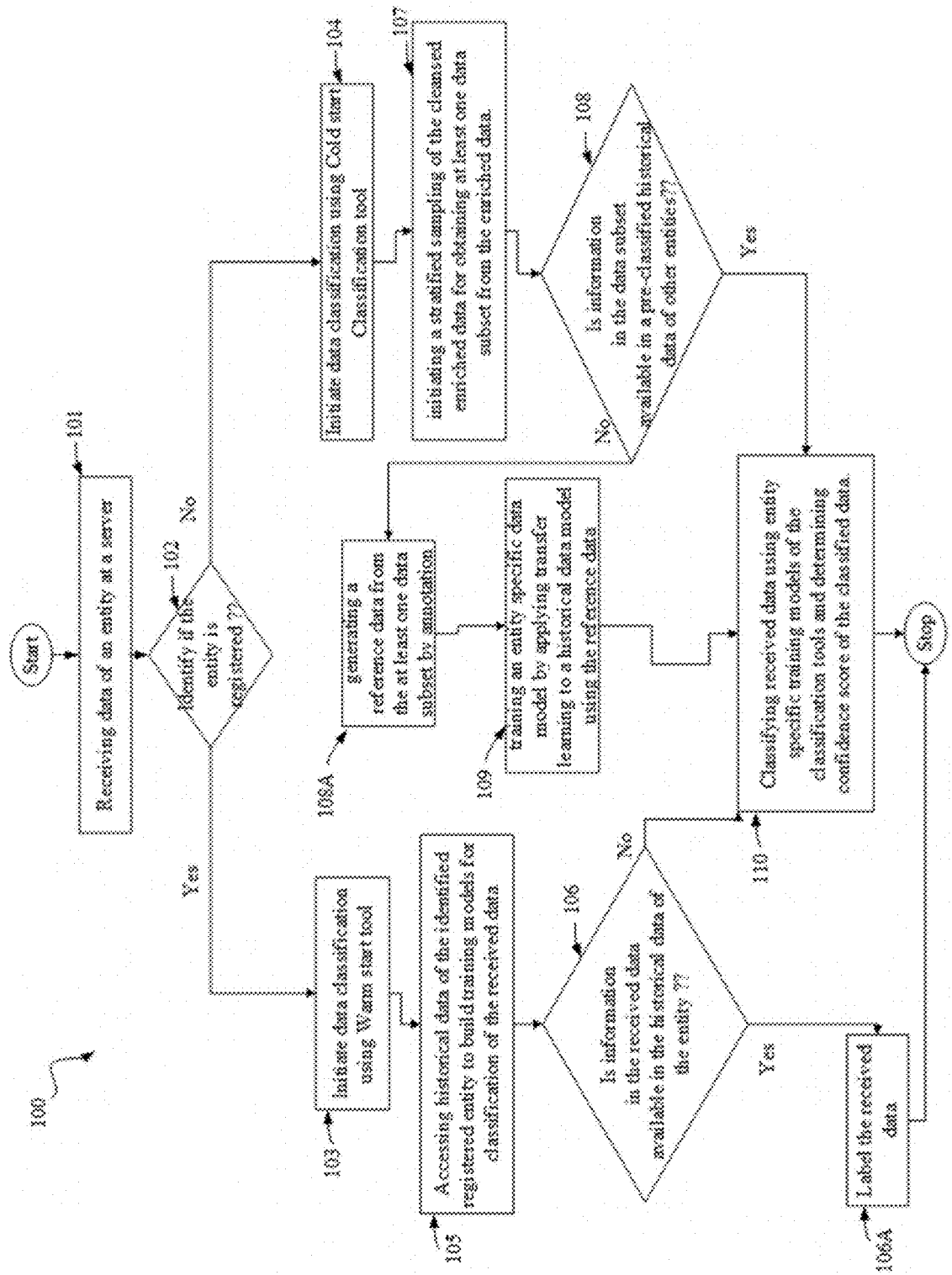
FIG. 1 is a flowchart depicting a method of data classification in accordance with an embodiment of the invention.

Described herein are the various embodiments of the present invention, which includes a method and a system of data classification using an artificial intelligence engine configured to integrate a warm start classification tool or a cold start classification tool with AI based annotation for data classification.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "data," "supplier description," or "transactions," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for data classification with multiple integrated tools configured for generating classified data with confidence score while working on many applications including but not limited to enterprise application.

Referring to FIG. 1, a flowchart 100 depicting a method of spend data classification is provided in accordance with an embodiment of the present invention. The method includes the steps of receiving data of an entity at a server in step 101. In step 102 identifying if the entity is a registered entity. If the entity is registered then, initiating spend data classification using warm start classification tool in step 103, else initiate the data classification using cold start classification tool in step 104. If warm start classification is initiated, then in step 105 accessing historical data of the identified registered entity to build training models for classification of the received data. In step 106 checking if an information in the received data is available in the historical data of the identified registered entity. If the information is available, then in step 106A assigning labels to received data for classification. If cold start classification is initiated, then in step 107 initiating a stratified sampling of the cleansed enriched data for obtaining at least one data subset from the enriched data. In step 108 checking if information in the data subset available in a pre-classified historical data of other entities. In step 108A generating a reference data from the at least one data subset by annotation in case the information in the data subset is not available. In step 109 training an entity specific data model by applying transfer learning to a historical data model using the reference data. In step 110, classifying received data using entity specific training models of the classification tools and determining confidence score of the classified data.

In an embodiment, both the warm start classification tool and the cold start classification tool includes machine learning engine (MLE) and AI engine for obtaining the confidence score of the classified data.

In an embodiment, the confidence score is determined by using dropout in the entity specific data model as an approximation for variational inference to predict sample mean prediction and an uncertainty estimate.

Figure 1A:
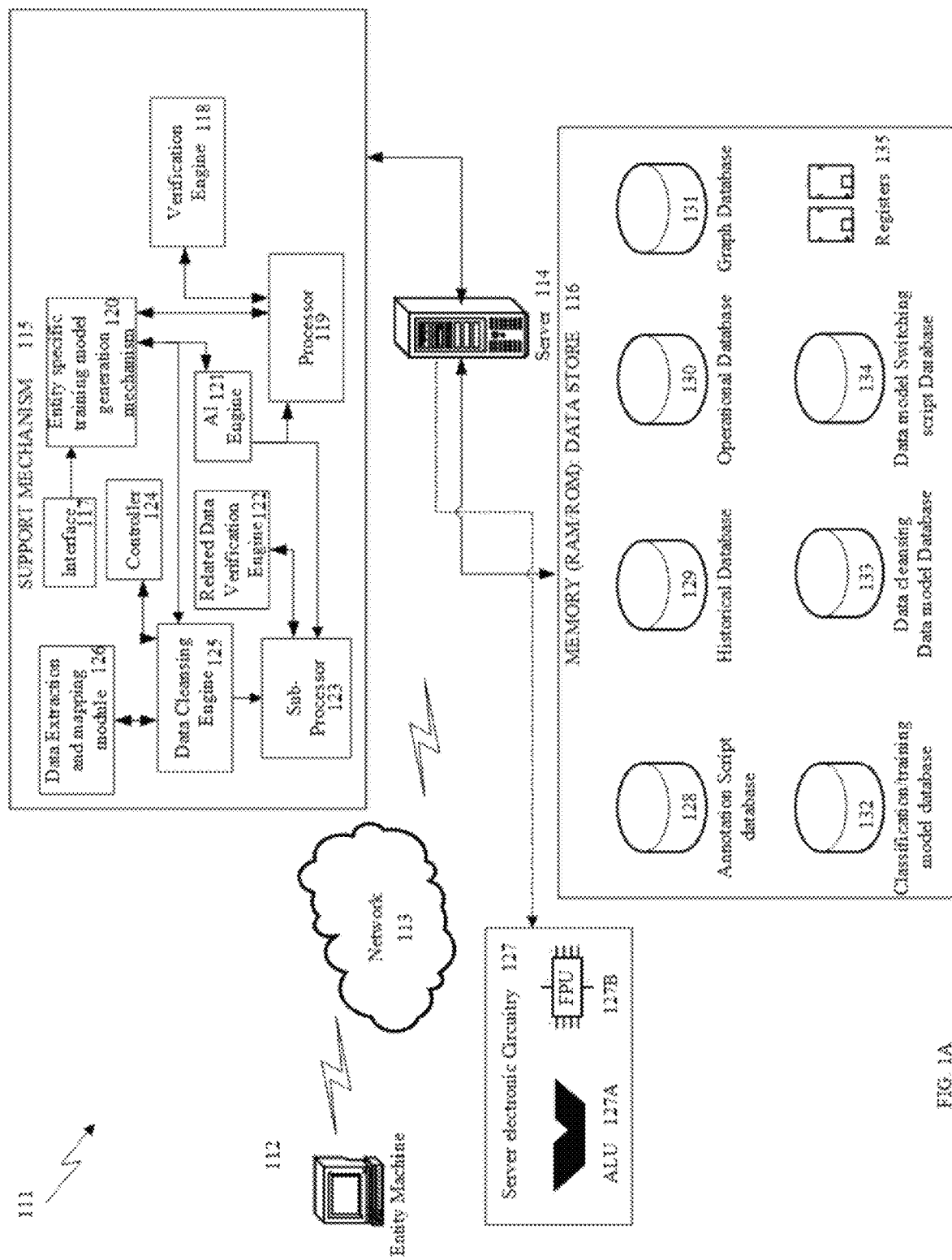
FIG. 1A is a view of a data classification system in accordance with an embodiment of the invention.

Referring to FIG. 1A, a system 111 for data classification is provided in accordance with an embodiment of the present invention. The system 111 includes at least one entity machine 112 for sending data over a network 113. The system further includes a server 114 configured to receive the data from the entity. The system 111 includes a support mechanism 115 for performing data classification functions depending upon the type of entity i.e registered or unregistered/new and the type of data received at the server 114. The system 111 includes a memory data store 116 for accessing data from registered and unregistered entity and also storing plurality of training classification models, annotation scripts and data model switching script created by support mechanism 115. The system includes an AI based annotation for determining unknown information of the received data.

In an embodiment the server 114 of the invention may include various sub-servers for communicating and processing data across the network. The sub-servers include but are not limited to content management server, application server, directory server, database server, mobile information server and real-time communication server.

In an embodiment the entity machine 112 may communicate with the server 114 wirelessly through communication interface, which may include digital signal processing circuitry. Also, the entity machine 112 may be implemented in a number of different forms, for example, as a smartphone, computer, personal digital assistant, or other similar devices.

In an example embodiment, the support mechanism 115 of the system 111 includes an interface 117 for accessing information received at the server. The support mechanism further includes a data cleansing engine 125 for normalizing data already available with the data store 116 of the system 111 and also cleansing of the received data at the server 114. The support mechanism 115 includes a verification engine 118 for verifying/identifying if the entity is a new entity. The support mechanism 115 further includes an entity specific training model generation mechanism 120, an AI engine 121 configured for enabling classification of received data depending on the training models of the model generation mechanism 120, a processor 119 configured for performing various functions including but not limited to selecting appropriate classification tool, enabling AI engine 121 to integrate annotation script and appropriate classification tools to classify received data.

In a related embodiment, for data cleansing and enrichment the support mechanism 115 of the system 111 further includes a related data verification engine 122 configured for determining characteristics of the received data and verifying a historical database for identifying at least one related data for the received data based on the characteristics. The system also includes a sub-processor 123 configured for processing the received data, the identified related data for determining if the related data is a cleansed data and recharacterizing the received data based on the related data. The support mechanism includes a controller 124 encoded with instructions enabling the controller to function as a bot for initiating a data cleansing and normalization operation on an identified dataset if the related data is not a cleansed data. The identified dataset includes the at least one related data of the historical database and the received data.

In example embodiment the server 114 shall include electronic circuitry 127 for enabling execution of various steps by the processor. The electronic circuitry has various elements including but not limited to a plurality of arithmetic logic units (ALU) 127A and floating-point Units (FPU) 127B. The ALU enables processing of binary integers to assist in formation of a data matrix of variables where the classification/training model is applied to the data matrix for obtaining confidence score of classified spend data. In an example embodiment the server electronic circuitry 112 as shown in FIG. 1A, includes at least one Athematic logic unit (ALU) 127A, floating point units (FPU) 127B, other processors, memory, storage devices, high-speed interfaces connected through buses for connecting to memory and high-speed expansion ports, and a low speed interface connecting to low speed bus and storage device. Each of the components of the electronic circuitry 127, are interconnected using various busses, and may be mounted on a common motherboard or in other manners as appropriate. The processor can process instructions for execution within the server 114, including instructions stored in the memory or on the storage devices to display graphical information for a GUI on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

The processor 119 may be implemented as a chipset of chips that include separate and multiple analog and digital processors. The processor 119 may provide coordination of the other components, such as controlling user interfaces, applications run by devices, and wireless communication by devices.

The Processor 119 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor 119, so as to enable near area communication of device with other devices. External interface may provide, for example, for wired communication in some implementations, or for wireless communication in other implementations, and multiple interfaces may also be used.

Referring to FIG. 1A, the various elements like the support mechanism 115, the memory data store 116 are shown as external connections to the server 114 in accordance with an embodiment of the invention. However, it shall be apparent to a person skilled in the art that these elements may be part to an integrated server system. Also, some of the sub-elements of the support mechanism 115 and the memory data store 116 either alone or in various combinations may be part of a server system as other external connections.

In an example embodiment, the memory data store 116 includes plurality of databases as shown in FIG. 1A. The data store 116 includes an annotation script database 128 for storing dynamically generated annotation scripts configured for generating reference data by processing at least one data subset based on a dynamic processing logic, a historical database 129 for storing data from identified registered entity, an operational database 130 configured for storing received data, a graph data base 131 configured for storing graph structures for semantic queries with nodes, edges and properties to represent and store data, a classification/training model database 132 configured for storing a plurality of classification/training models required to classify the received data, a data cleansing data model database 133 for storing a plurality of data models configured for cleaning and normalization of datasets received from a plurality of entities, a data model switching script database 134 for storing at least one switching script created by a bot based on the dataset, the plurality of data models and AI based dynamic processing logic for cleansing of the dataset. The switching script is configured to recharacterize the dataset and re-calibrate a plurality of functions of at least one application deploying the recharacterized datasets, a plurality of registers 135 as part of the memory data store 116 for temporarily storing data from various databases to enable transfer of data by a processor between the databases as per the instructions of the AI engine 122 to classify data and obtain confidence score of the classification.

The graph database 131 includes nodal connections of similar data values wherein the received data is added to the graph database for identifying the related data wherein a connection of the received data with the related data in the historical database is formed if a node in the graphical database with values similar to the received data is present else a new node for the received data is formed. The graph database 131 enables comparison of received data with only related data to which the received data is connected through a property/relation where a similarity score is computed between the nodes.

The dynamic processing logic integrates deep learning, predictive analysis, information extraction, optimization and bots for processing the at least one data subset.

The memory data store 116 may be a volatile, a non-volatile memory or memory may also be another form of computer-readable medium, such as a magnetic or optical disk.

The memory store may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

In an embodiment, the historical database includes information about the identified registered entity to enable selection of the warm start classification tool. The annotation script database includes dynamically generated data models related to at least one new entity enabling selection of the Cold start classification tool. The annotation script is created by the bots based on the at least one data subset and the cleansed enriched data stored in the operational database.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an exemplary embodiment, the system 111 includes a data extraction and mapping module 126 with support architecture of computer vision and AI engine configured to process a data object like an invoice document to obtain a data proposal like an image data wherein the received data is obtained by optical character recognition of the invoice document.

In an embodiment, the received data is an item data, supplier data or a data string extracted from at least one data source.

In another exemplary embodiment, the system 111 includes image processing architecture configured for processing image data with MRO parts to obtain the received data from specification data of MRO parts.

Figure 2:
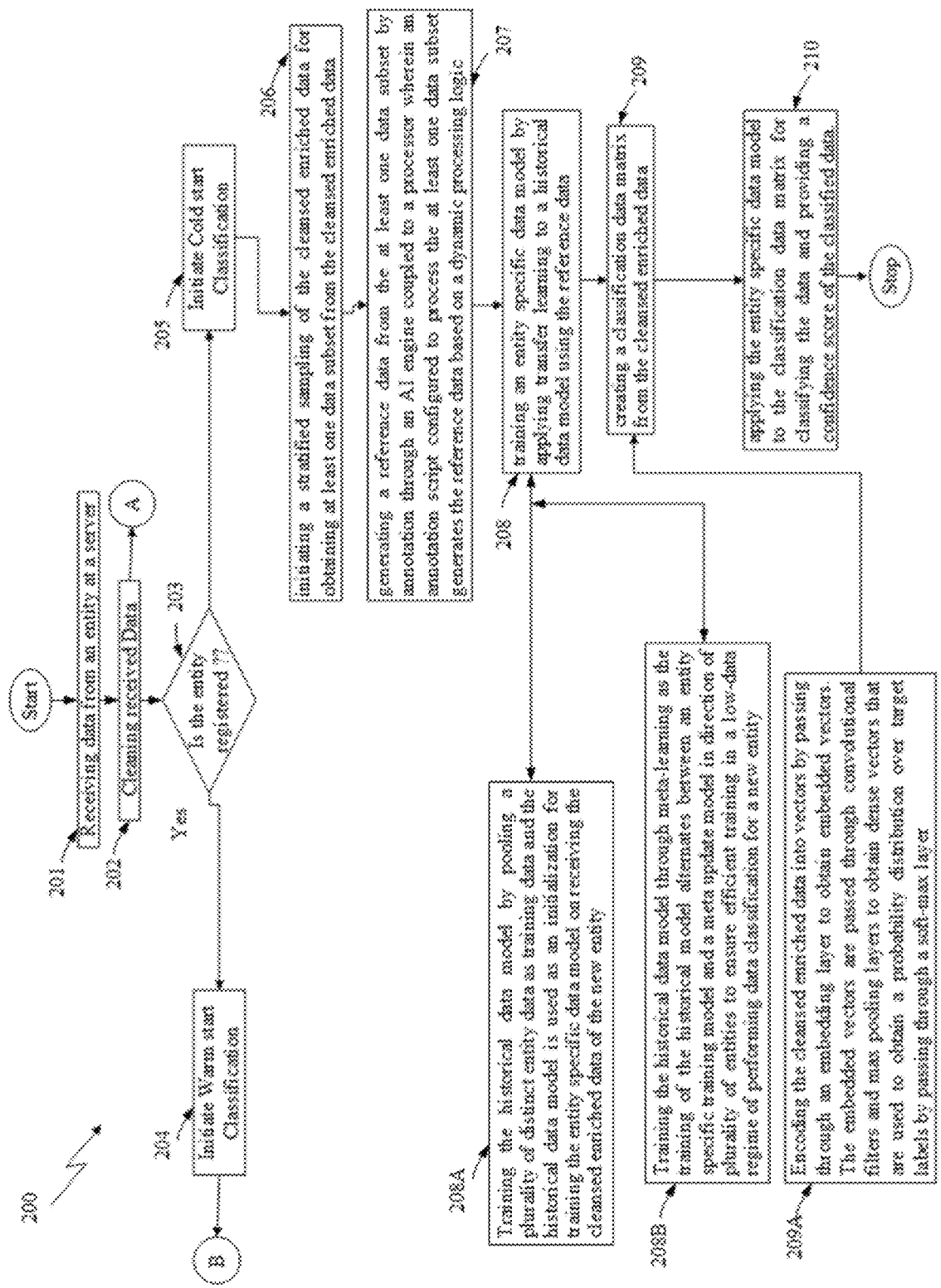
FIG. 2 is a flowchart detailing the method for data classification using a warm start classification tool and a cold start classification tool in accordance with an embodiment of the invention.

Referring to FIG. 2, a flowchart 200 depicting detailed method of data classification using cold start classification tool is provided in accordance with an embodiment of the invention. The method includes the step 201 of receiving data from an entity at a server. In step 202 cleansing the received data and in 203 checking to identify if the entity is a registered entity. If the entity is already registered, then in 204 initiating warm start classification else in 205 initiating a cold start classification process. In step 206 initiating a stratified sampling of the cleansed enriched data for obtaining at least one data subset from the enriched data. In 207 generating a reference data from the at least one data subset by annotation through an AI engine coupled to a processor wherein an annotation script configured to process the at least one data subset generates the reference data based on a dynamic processing logic. In step 208, training an entity specific data model by applying transfer learning to a historical data model using the reference data. In 208A, training the historical data model by pooling a plurality of distinct entity data as training data and the historical data model is used as an initialization for training the entity specific data model on receiving the cleansed enriched data of the new entity. In 208B, training the historical data model through meta-learning as the training of the historical model alternates between an entity specific training model and a meta update model in direction of plurality of entities to ensure efficient training in a low-data regime of performing data classification for a new entity. In step 209 creating a classification data matrix from the cleansed enriched data. In 209A encoding the cleansed enriched data into vectors by passing through an embedding layer to obtain embedded vectors. The embedded vectors are passed through convolutional filters and max pooling layers to obtain dense vectors that are used to obtain a probability distribution over target labels by passing through a soft-max layer. The data matrix is obtained through the soft-max layer. In step 210, applying the entity specific data model to the classification data matrix for classifying the data and providing the confidence score of the classified data.

Figure 2A:
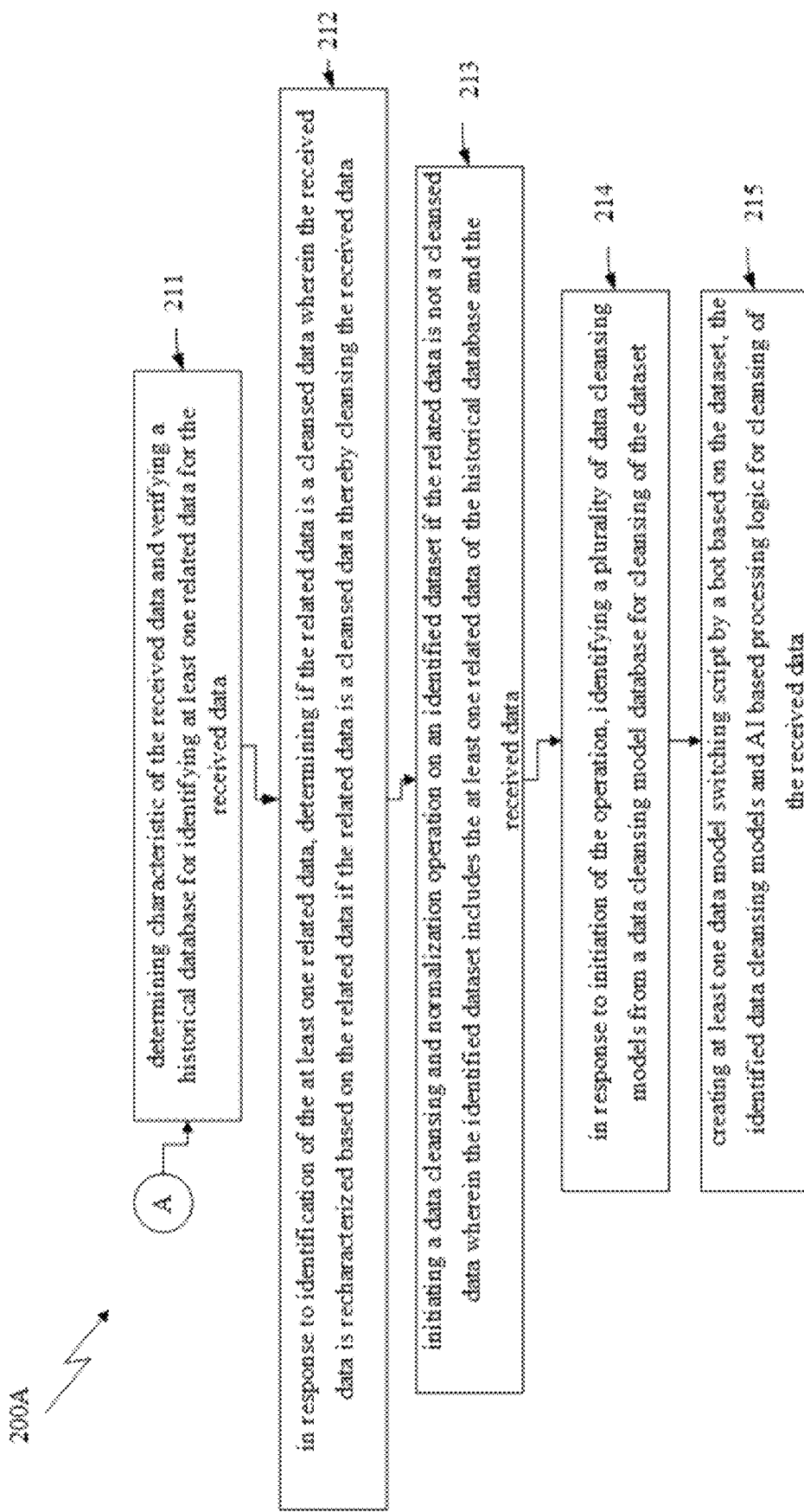
FIG. 2A is a flowchart depicting a method for data cleansing and enrichment in accordance with an embodiment of the invention.

Referring to FIG. 2A, the step 202 of cleansing received data includes the step 211 of determining characteristic of the received data and verifying a historical database for identifying at least one related data for the received data. In step 212, in response to identification of the at least one related data, determining if the related data is a cleansed data wherein the received data is recharacterized based on the related data if the related data is a cleansed data thereby cleansing the received data. In step 213 initiating a data cleansing and normalization operation on an identified dataset if the related data is not a cleansed data wherein the identified dataset includes the at least one related data of the historical database and the received data. In step 214, in response to initiation of the data cleansing and normalization operation, identifying a plurality of data cleansing models from a data cleansing model database for cleansing of the dataset. In step 215, creating at least one data model switching script by a bot based on the dataset, the identified data cleansing models and AI based processing logic for cleansing of the received data.

Figure 2B:
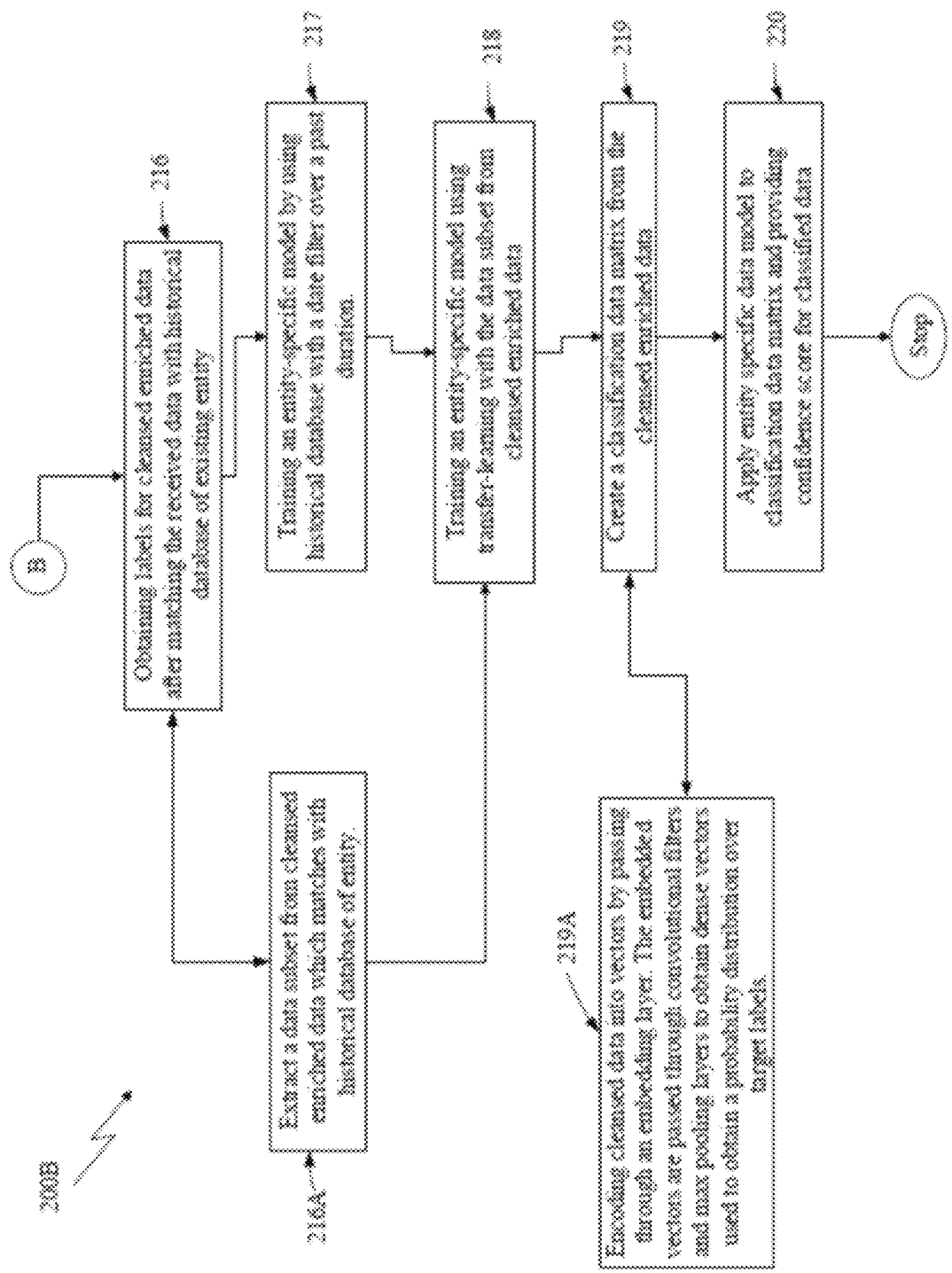
FIG. 2B is a flowchart depicting a method for warm start classification in accordance with an embodiment of the invention.

Referring to FIG. 2B, flowchart depicting the warm start classification method is shown in accordance with an embodiment of the present invention. The method includes the step 216 of obtaining labels for cleansed enriched data after matching the received data with historical database of existing entity. In step 216A extracting a data subset from cleansed enriched data which matches with historical database of entity. In step 217 training an entity-specific model by using historical database with a date filter over a past duration. In step 218 training an entity-specific model using transfer-learning with the data subset from cleansed enriched data. In step 219 creating a classification data matrix from the cleansed enriched data. In step 219A encoding cleansed data into vectors by passing through an embedding layer, the embedded vectors are passed through convolutional filters and max pooling layers to obtain dense vectors used to obtain a probability distribution over target labels. In 220, applying entity specific data model to classification data matrix and providing confidence score for classified data.

In an embodiment, the data cleansing process includes multiple pre-classification processes including de-duplication, using natural language processing to clean names and graph database to calculate the similarity among received data. The process takes an excel file from user of data with their detail through UI and outputs de-duplicated data along with their enriched attributes in an excel. It also displays a JSON table of top de-duplicated data along with an analysis of the whole process like the percentage of data deduped and other key statistics. The application is containerized and stored in a docker container as it provides seamless integration between multiple environments, with the docker container acting as a lightweight and modular virtual machine.

The input file is stored to a Blob and the coding layer hits the flask-based API exposed to it, deployed as a Web-application. This method provides scalability and reliability for application deployment. Then it connects to Blob Storage, File Storage and accesses various data files and config files along to run the process. The status file to be displayed and the log files are stored to tables. Table storage stores large amounts of structured data. Table storage is a No-SQL database which stores data in a key-value pair.

Figure 3:
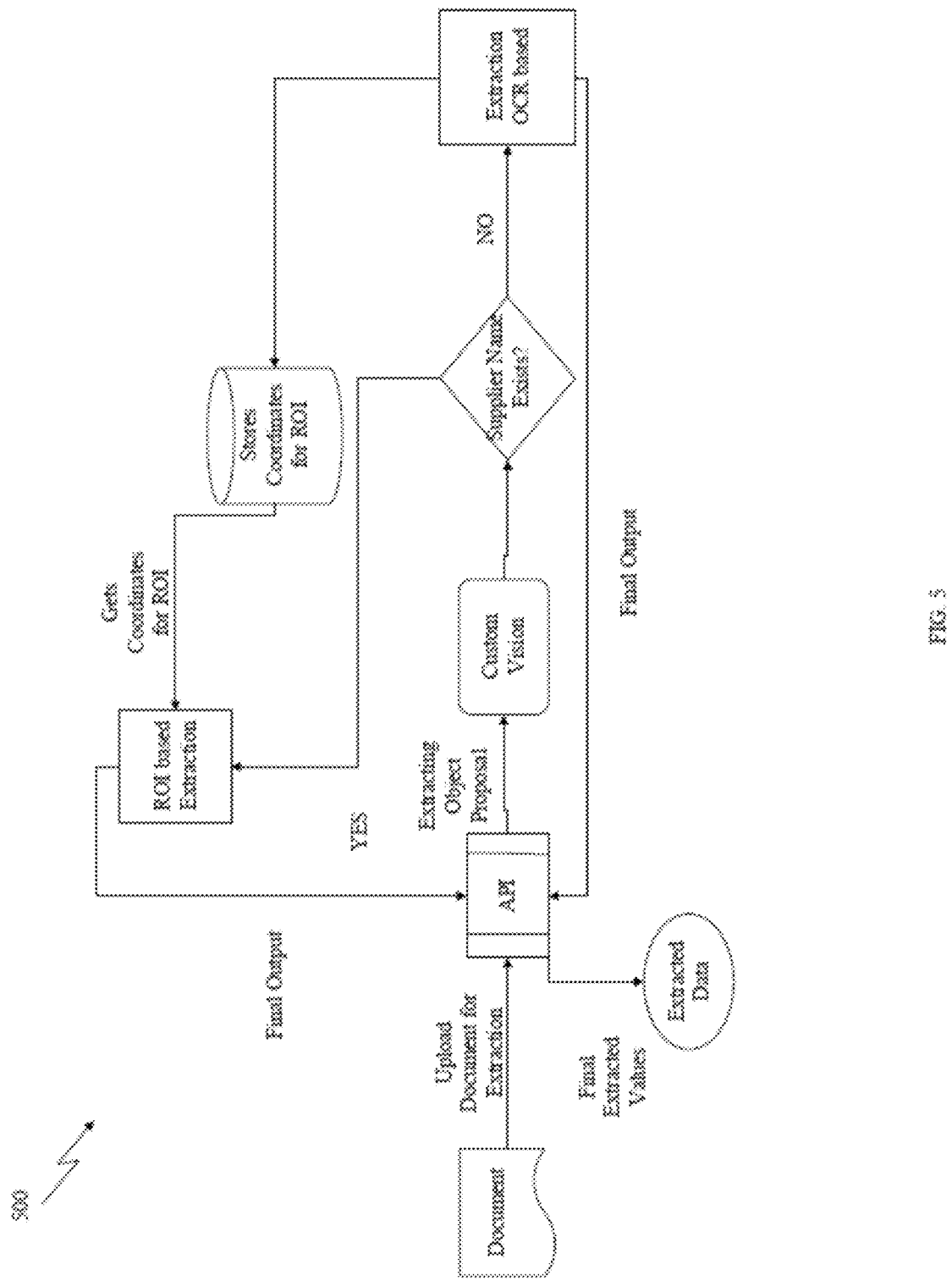
FIG. 3 is a flowchart depicting an example of method of supplier data classification in accordance with an embodiment of the invention.

In an example embodiment, the cleansing includes deduplication of received data. Some of the key variables used in deduplication are supplier name, parent name, contact details, email domain, category, and supplier manager. The accuracy improves even further with VAT Registration Number, TIN Number, Dun and Bradstreet Number, and Doing Business As. Referring to FIG. 3, a flowchart 300 depicting method of deduplication of supplier name for cleansing of data is shown in accordance with an example embodiment of the present invention. The method includes the step 301 of receiving data, and 302 of selecting relevant data columns. In step 303, supplier name is cleansed where Parent master data enables enriching parent information using supplier Data in 303A and cleaning Parent name in 303B. In step 304 deduplicating suppliers with similar ID. In step 305 checking if the suppler has multiple Parents, if yes then in 306 resolving parent conflict. In step 307 checking if supplier has Parent, if yes, then in 307A checking if parent have multiple suppliers, if no, then in 307B checking if all supplier has supplier category. If parent have multiple suppliers or supplier have supplier category, then in 308 supplier names comparison with parent is done and it is checked if there are any similar supplier groups. If there are similar supplier group then in 309 merging similar supplier names to single deduplicated supplier name, else in 310 processed names are assigned as deduplicated name. If in 307B all supplier does not have supplier category, then in 311 load data as a graph with suppliers as nodes. In step 312 calculating string similarity across suppliers with each other and it is checked if there are any supplier clusters. If there are clusters then merging similar supplier names to single deduplicated supplier name, else the processed name is assigned as deduplicated name. In step 313 consolidating data from multiple processes. In 314 resolving potential abbreviated supplier names and then assigning proper legal entity to deduplicated name in 315. After determining legal entity in 316 updating the database and in 317 accuracy of result is calculated before generating a user report in 318.

Referring to FIG. 3A-3F, examples of data cleansing and enrichment by deduplication is provided in accordance with embodiment of the present invention. In FIG. 3A, a table 300A provides an example of output from the system after cleansing including accuracy of the results. In FIG. 3B, a table 300B provides an example of supplier deduplicated on inconsistent legal entities like XYZ US INC, XYZ, XYZ INC and XYZ LLC are all enriched and made consistent to XYZ INC. In FIG. 3C, a table 300C provides an example of supplier deduplicated on inconsistent punctuations. In FIG. 3D, a table 300D provides an example of cleansing by deduplication of abbreviated names. In FIG. 3E, a table 300E provides an example of deduplicating mis-spelt names and in FIG. 3F, a table 300F provides an example of deduplicating partially filled names.

In an exemplary embodiment, for faster querying to cleanse the data an AI based search is utilized. The AI engine enables indexing of documents according to dynamic rules thereby improving the performance of the database itself when complex queries are processed as the tables are indexed. Indexing in this context means that field values are mapped to documents or rows for faster searching through AI engine. The engine may use parallelization across multiple cores in the system. Instead of having to search through the entire document or row space for a given value, the system can find that value in its internal index and immediately know which documents or rows contain it. This, of course, makes querying significantly faster. The system captures the user input text and auto-suggest similar names. Once a name is set, system auto fills all the properties from existing data based on a query.

In another exemplary embodiment, the graph database of the system enables deduplicating a potential duplicate profile created on real time basis. Since, speed is paramount a graph database that uses graph structures for semantic queries with nodes, edges and properties to represent and store data is utilized. In an advantageous aspect, the graph (or edge or relationship) directly relates data items in the datastore. The relationships allow data in the datastore to be linked together directly, and in many cases retrieved with single operation. Instead of storing links between data in the data itself, and querying search for this data within the data store and later using some join concept to collect the related data, the graph databases are configured to allow simple and fast retrieval of complex hierarchical structures that are difficult to model in relational systems.

Figure 4:
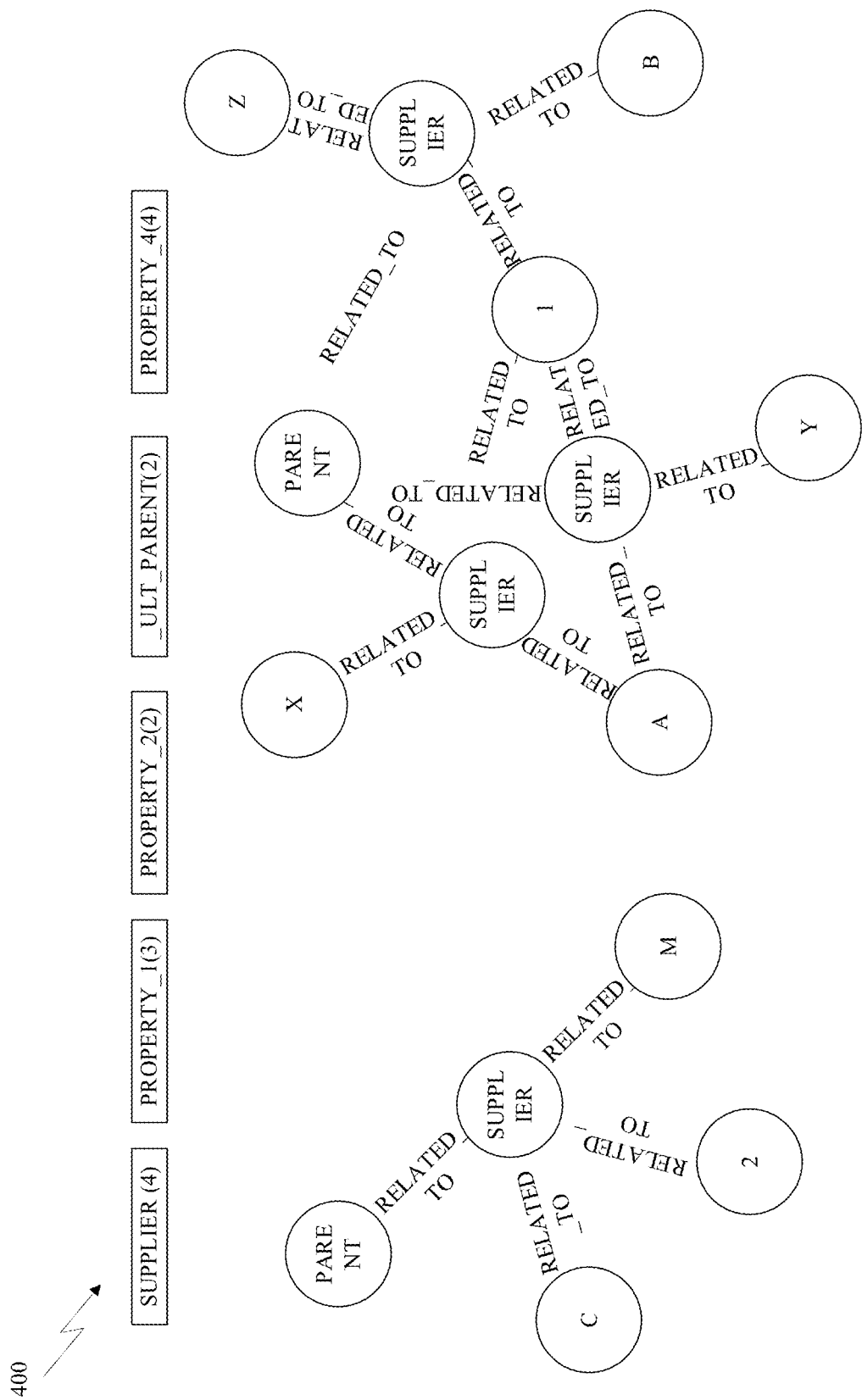
FIG. 4 shows a perspective view of a graph database structure in accordance with an embodiment of the invention.

In an example embodiment as shown in FIG. 4, a graph database structure 400 handling deduplication of a supplier profile is shown in accordance with an embodiment of the present invention. As shown 4 Supplier Nodes and different properties are represented in different nodes. When a new supplier profile is created, it is added to graph database. If a node with same values are already present, it will form a connection to the existing node else it forms a new node. Instead of making a match query that will compute with all existing suppliers that are present in the database, the Graph database is configured to compare only with those suppliers with which it is connected through a property and compute a similarity score between two connected supplier nodes. Then their name similarity score is computed and if both scores meet a threshold, the system merges the supplier nodes, and updates the property nodes with new data. This saves lot of time and space. The property similarity (PS) between connected nodes in a transversible graph is determined as:

$$PS = \frac{No.\ of\ same\ Property\ Nodes\ (PN)\ shared}{Max.\ (Total\ no.\ of\ PN)}$$

If the score is zero or below a threshold, then there are no duplicates in the data.

In an embodiment the data may be received from multiple sources. One such source is from purchase orders (PO) and invoices where a line item in the PO or invoice corresponds to one sample. Another source for data could be from the General Ledger (GL) which is maintained by the accounting team. Each sample thus has several attributes obtained from different sources. These attributes are the supplier name, PO description, GL description, invoice description and materials descriptions. The received data may be obtained from a document that requires conversion to extract the data. Any document like a PDF or JPG file would require conversion of images to text to obtain a data string which is then utilized for classification. Optical character recognition (OCR) techniques for conversion of a document like invoice is used where computer vision and AI engine are configured for processing the invoice document to obtain the data. Since, OCR may have multiple accuracy issues at the time of extraction of data, the system of the present invention deploys an AI based processing of the extracted data to determine accuracy of extraction before the data is send for classification.

In an embodiment, the received data is extracted from a data object by a data extraction method. The data extraction method includes identifying a type of data object; sending the data object to at least one data recognition training model for identification of at least one object proposal with a confidence score wherein the training model processes the data object based on prediction analysis by a bot for obtaining the object proposal; cropping the at least one identified object proposal; extracting text data from the object proposal by optical character recognition; and validating the text data after processing through an AI based data validation engine. The method further includes the step of determining if the extracted data relates to an existing entity; and identifying data attributes associated with the data object received from the existing entity based on at least one region of interest script wherein the region of interest script is generated by the bot based on processing of historical database of the identified existing entity.

In an embodiment, the data extraction method includes determining if the extracted data relates to a new entity, extracting data attributes from the data object through optical character recognition; and storing the extracted data attributes and coordinates of the data attributes with respect to the new entity in a database.

Referring to FIG. 5, an architecture diagram 500 of a data extraction from a document is shown in accordance with an embodiment of the invention. The architecture includes a region of interest script configured for identifying data attributes associated with the data object wherein the region of interest script draws bounded box around the data attributes of the data object before cropping the data attributes in the drawn box and converting the data attributes to text for data extraction.

In an example embodiment, the document being a Pdf or a Jpg file like an invoice hits an API along with a unique ID in a header of the document. If the invoice is a pdf then the first page of the Pdf file is converted to a JPG file. The JPG file is sent to a training model that identifies coordinates for an object proposal/logo using objection detection technique. Once the coordinates are identified, the part of the logo is cropped and sent to OCR for parsing the text inside the image. This text is considered as the name of the supplier in case the document is an invoice. If an invoice document with a supplier has already been worked on, then the attributes are identified using a region of interest (ROI) approach. The data object is then sent to OCR for image to text conversion. The text is searched for keywords matching header attributes. For addresses, a bounding box is drawn from the matching header keyword. This bounding box is drawn from the matching header keyword. The bounding box is cropped from the image and sent to an OCR for image to text. Pre-validations done on the extracted data before sending back to the user.

In a related embodiment, all the header fields extracted from an invoice document are successfully matched with the master tables. All the line items for a corresponding PO number are successfully matched with the Purchase Order tables.

In an example embodiment, the extracted headers are mapped through a mapping layer. The input for the mapping layer is the output of the invoices AI module, which extracts header and line-level information from an invoice file, along with the following inputs: bpc_code (passed as a header parameter: Buyer_Partner_Code); region_id (read from env variables). The system establishes a connection using multiregion_credentials with the respective database and with the use of the BPC, Region_id, we navigate to the necessary table(s) in the database Example: Region_id=15 for dev, BuyerPartnerCode=405505.

In an example embodiment, the data attributes extracted include Partner Name, Payment terms, Address etc. For attribute as Partner Name, the system takes the potential candidates for the partner name from the invoices AI module and try to match each of those possible names with details in the prn_Partnerdetails table. The system does a fuzzy string match. Whatever name gives the highest match and if match score is >0.89, the Partner_Name code in the master table is fetched and also the Confidence. If the match threshold is not met, the extracted name we get from the logo is fetched as Partner_Name and Confidence: '0' and ID". For attribute as Payment terms, the system gets PaymentTerms from the invoices AI module and do exact match with entries in the CSM_PaymentTerm table. If we get a match, system returns paytermid. And confidence: '1'(since, it's an exact match) If not, return only name. Confidence: '0' and ID". For attribute as Addresses terms like Ship to Address, "Bill to Address" and "Remit to Address" are identified in the data object through Cosine similarity logic (using tfidf vectorizer) and match with entries in the CSM_Address table. If the score is >0.5 for the complete address, we return the matched code under ID key and also the confidence. If the score is <0.5, we return just name. Confidence: '0' and ID".

In an exemplary embodiment, the AI based application takes the data object as an input, the invoice tables extract header and line level information from the invoices and sends the extracted text to the mapping layer. The mapping layer refers to the master tables and maps the extracted text with confidence thresholds and sends the mapped IDs back to the invoice module for consumption. The master tables for a BPC are referred to, for mapping the extracted information to their corresponding IDs, via the multi-region configuration.

In another exemplary embodiment, a data recognition training model enables identification of at least one object proposal/logo with a confidence score. In the training model the logo/images are labeled with bounding boxes with the class as logo. Post labeling the images, a pre-trained object detection model is trained on the labeled images. Post achieving an accuracy threshold (metrics in focus are precision and recall), the model is deployed.

Referring to FIG. 6A, example descriptions obtained from different sources used as input to perform data classification is shown in table 600A. General ledger description is obtained from the accounting team and other descriptions are obtained from a procurement team within a company.

In an embodiment, for data classification, the supplier name is used as one input and a concatenation of all descriptions is used as another input to a data model. Additionally, the supplier country and region used as inputs to the model as the description could vary depending on the source location. In FIG. 6B, a table 600B providing example with supplier names, countries and regions also used as auxiliary input to the data classifier is shown.

In an embodiment the data such as spend data needs to be classified into categories to enable company level spend analysis and cost cutting decisions. A normalized taxonomy of spend categories is used across all the entities to ensure uniformity and ease of on-boarding a new entity. The normalized taxonomy has 4 levels and the granularity of spend category increases from L1 to L4. L1 has 16 categories and L4 has about 15000 categories. An example of L1 category can be "General Services and Supplies" and an example of L4 category can be specific such as "General Services and Supplies: Facilities and Maintenance: Other Facilities and Maintenance: Toaster/Toaster Oven/Bread maker". Referring to FIG. 6C, a table 600c providing examples showing label taxonomy L1 to L4 labels within the normalized taxonomy for items in manufacturing industry is shown. The granularity of label representation increases going from L1 to L4.

In one embodiment, description and supplier names can be noisy and reduce the performance of data classifier. To handle this problem, several preprocessing steps are performed to clean and enrich the descriptions. The system handles entities from multiple jurisdictions and the descriptions need not be in English. Translation to English is applied as a preliminary preprocessing step. Several keywords could also be repeated across different description attributes which is redundant information for the classifier. As explained earlier, keyword deduplication is also performed as a part of preprocessing. There could be some instances where detailed natural text descriptions are provided. To handle these samples, a pipeline of preprocessing is performed where frequently occurring words such as "the, an" are removed and word lemmatization is performed which results in a description like other samples.

In one embodiment, the received data may be structured or unstructured data. For received data like spend description that can be considered as short text containing a series of keywords without grammatical structure, a convolutional neural network is generated by the system that focuses on the presence of keywords rather than the sequence for feature extraction.

In an example embodiment, One-dimensional convolutions are performed on the sequence of word embedding vectors provided as inputs. Each convolution operation is referred to as a filter h and has a filter width w. The one-dimensional convolution operation for a word sequence f is given by:

$$(f * h)(m) = \sum_{i=0}^{w} h[i] f[m-i]$$

Three different window widths with 128 filters for each window width are used. This would ensure filters learned for different n-grams in the training dataset. The model output is the Soft-max layer with a size equal to the number of categories present.

Figure 7:
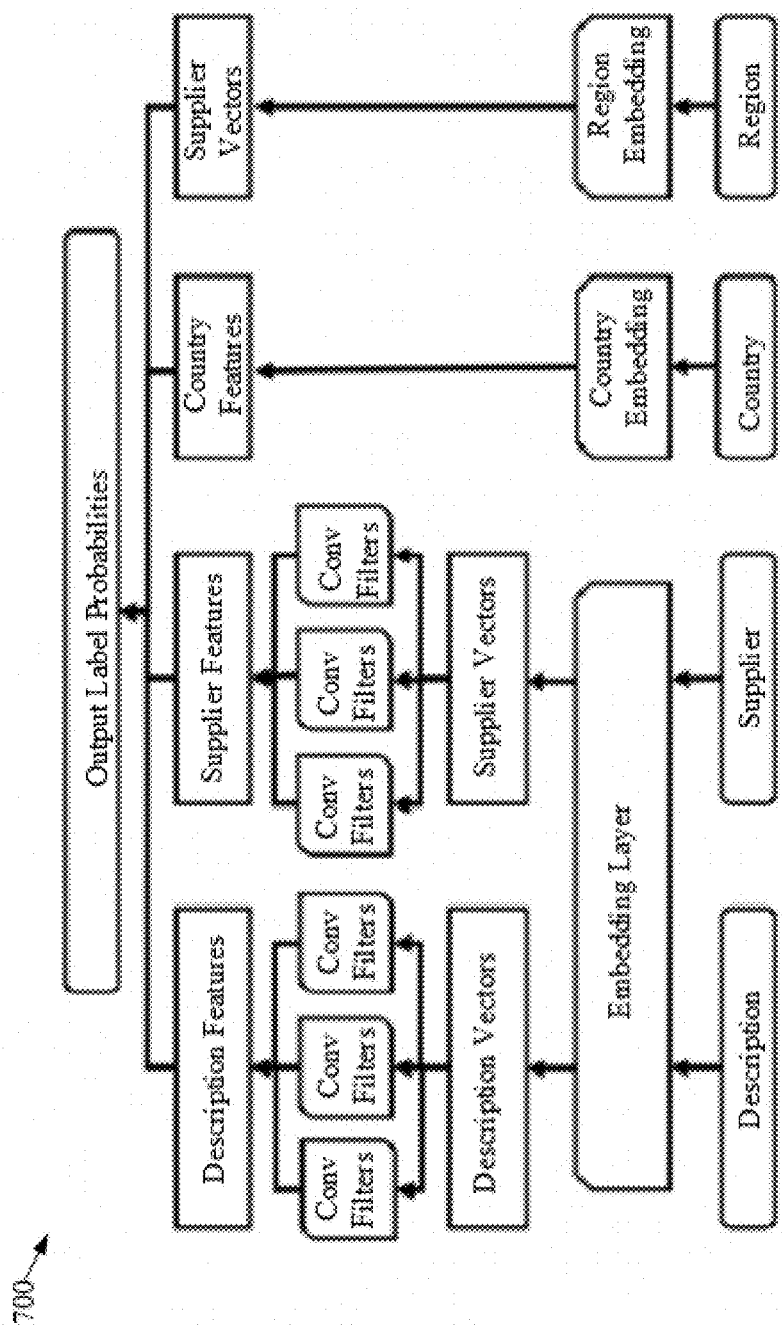
FIG. 7 shows a convolutional neural network model for data classification in accordance with an embodiment of the invention.

Referring to a block diagram 700, different components of the data classifier are shown in FIG. 7. This results in a probability distribution p with the probability of a category, i, obtained by the Soft-max operation over the model logits $z_i$:

$$p_i = \frac{e^{z_i}}{\sum_j e^{z_j}}$$

The data classifier is trained using back-propagation algorithm where the errors of misclassification are propagated through the network as a feedback mechanism to update the model parameters and word embedding vectors. The categorical cross entropy (CE) loss function is used for computing the gradients for training the network. The desired probability distribution y is one-hot encoded vector with a probability of 1 for desired category and the predicted distribution p is output by the soft-max layer of the model with the CE loss over M categories given by:

$$\mathcal{L}_C = -\sum_{i=0}^{M} y_i \log(p_i)$$

To avoid over-fitting to the training data, dropout is used where a random subset of weights in the model are set to zero for each iteration of training the model. This stochasticity is equivalent of performing model assembling where each model of the ensemble is a snapshot of complete model with some weights set to zero.

Figure 8A:
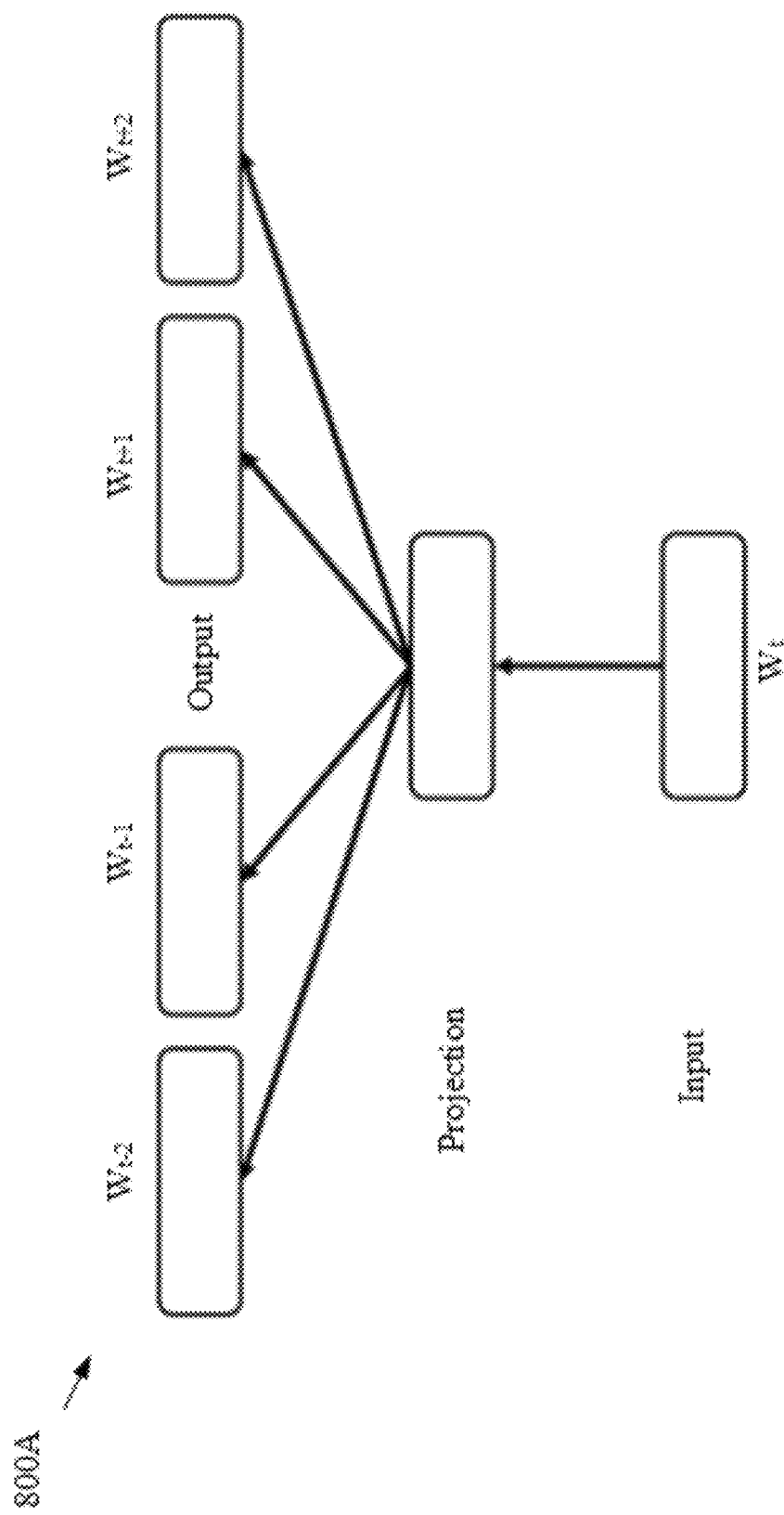
FIG. 8A, shows a model used to train custom word embedding over the data descriptions where a current word vector is sent through a projection to predict word embedding vectors of surrounding words under a skip-gram model in accordance with an embodiment of the invention.

Word embeddings are learned representations for text, where similar words have similar representations. Specifically, contextual embeddings are trained on the spend corpus per industry and is quite useful for spend data. For example, a description like "honey spice touch marker" has vocabulary belonging to the food and beverage category but actually belongs to wood finishing due to the presence of the words "touch marker". The word embeddings are trained using the skip gram model 800A where the current word embedding is used to predict the word embedding of the surrounding context as shown in FIG. 8A. The embeddings trained using the "fasttext" framework follow a skip-gram model maximizing the following log likelihood equation:

$$\mathcal{L} = \sum_{i=0}^{T} \sum_{c \in C_+} \log(p(w_c | w_t)),$$

where context $C_t$ is the set of indices of words surrounding the word $w_t$. Each word $w_t$ is represented as a combination of multiple character n-grams.

For the training of embeddings all n-grams are extracted for n>=3 and <6. Each n-gram is associated with a vector $z_g$, leading to the following scoring function is:

$$s(w, c) = \sum_{g \in G_w} z_g^T v_c,$$

where $G_w$ are all the possible n-grams and $v_c$ is the corresponding character vector. This allows sharing of information across different words and the ability to represent rare words. Word embeddings can capture the semantic meaning of words. For example, the relationship of screwdriver is to screws as hammer is to nails is captured by similar vectors in the word embedding space 800B as shown in FIG. 8B.

As an example, for fast-text embeddings trained on the manufacturing category and considering the word "Plumbing", words like "XYZ" and "ABC" have the highest similarity scores, since these two Services are associated to Plumbing in real life too. A low-dimensional space 800C obtained from the trained word embedding is shown for the example described above in FIG. 8C.

Typical spend descriptions can include several numeric attributes and industry specific keywords. These are encoded as out-of-vocabulary (OOV) w.r.t the word embeddings.

Figure 8D:
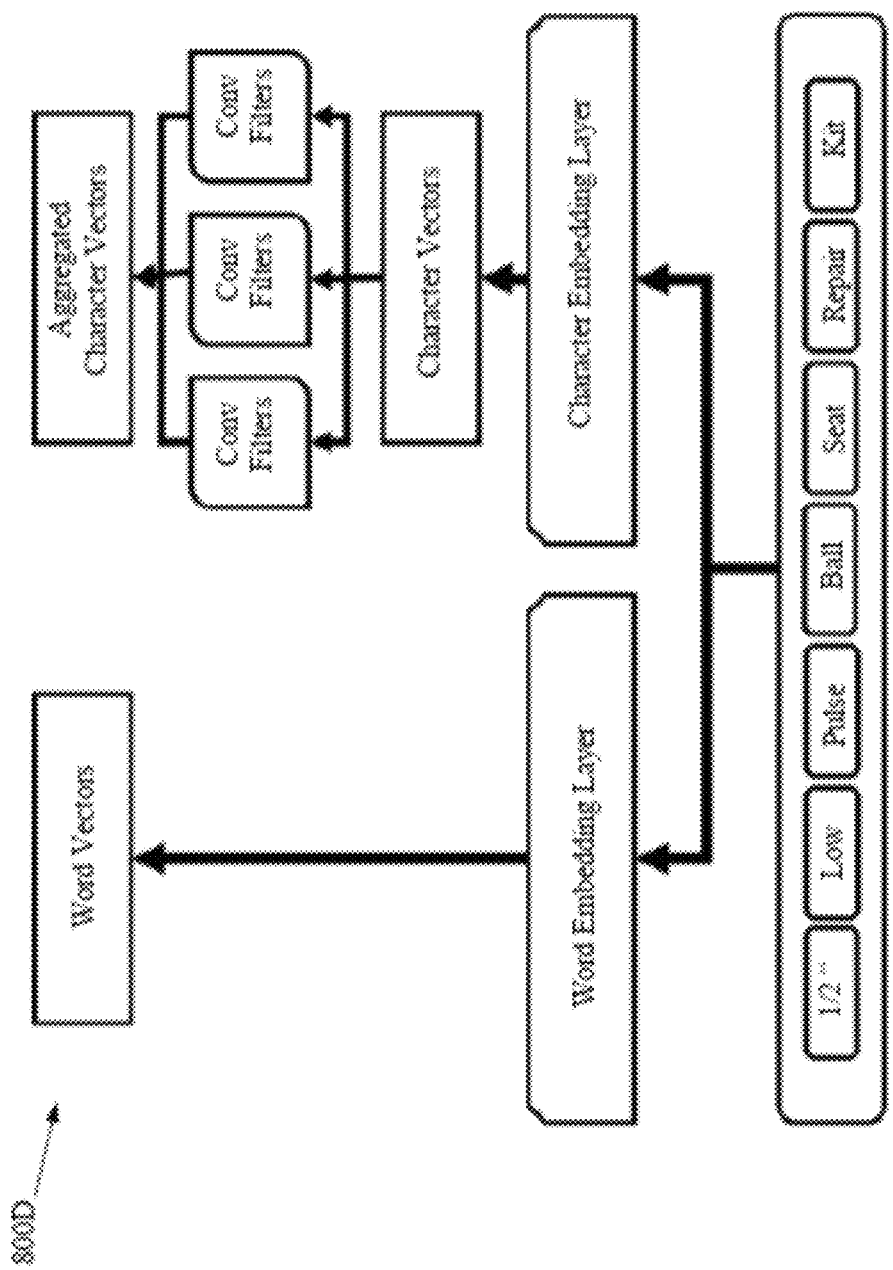
FIG. 8D shows flow for concatenating word embedding with character embedding to represent each word with a fixed dimensional vector where the character embedding vectors of a word are pooled using a convolutional neural network in accordance with an embodiment of the invention.

However, such attributes could contain useful information for classification. For example, the numeric attribute of "16-inch'" cannot belong to the Travel-expense category. Character embeddings are used to represent such OOV words where each character in the word is represented by a $D_c$ dimensional vector and the vectors of all characters in a word are aggregated using a character level convolutional neural network. A block diagram 800D of concatenating word embeddings with character embeddings is shown in FIG. 8D. This aggregated character embedding $v_c$ is concatenated with the word embedding $v_w$, to represent in each word in the text description.

$$V := [V_w V_c]$$

Figure 9:
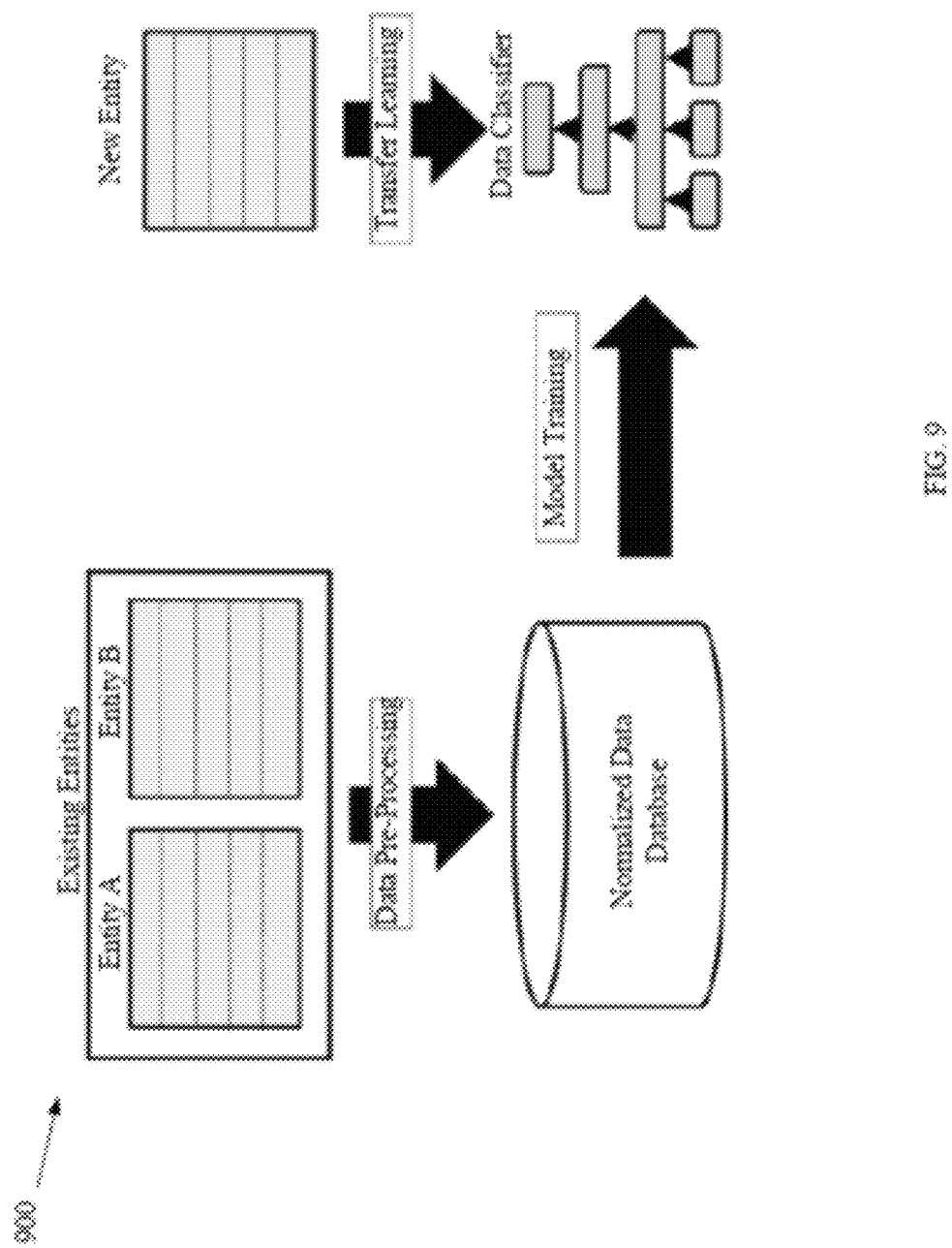
FIG. 9 shows a system for performing transfer learning on the data with a baseline model trained by pooling the data of all existing entities in accordance with an embodiment of the invention.

The on-boarding of an entity onto the enterprise application can be a tedious process where the entire spend data needs to be classified for additional spend analysis. Classifying spend data without any supervision could lead to poor performance and many mis-classifications. As a trade-off between the two approaches, transfer learning is used to ensure good performance of data classification. This is achieved by performing a stratified sampling of spend data of a new entity wherein samples with a diverse set of vocabulary are picked by the AI engine for annotation. Using this data, the data classifier is fine-tuned over the annotated dataset resulting in good performance over the remaining dataset. An intuitive representation 900 of performing transfer learning is shown in FIG. 9.

Figure 10:
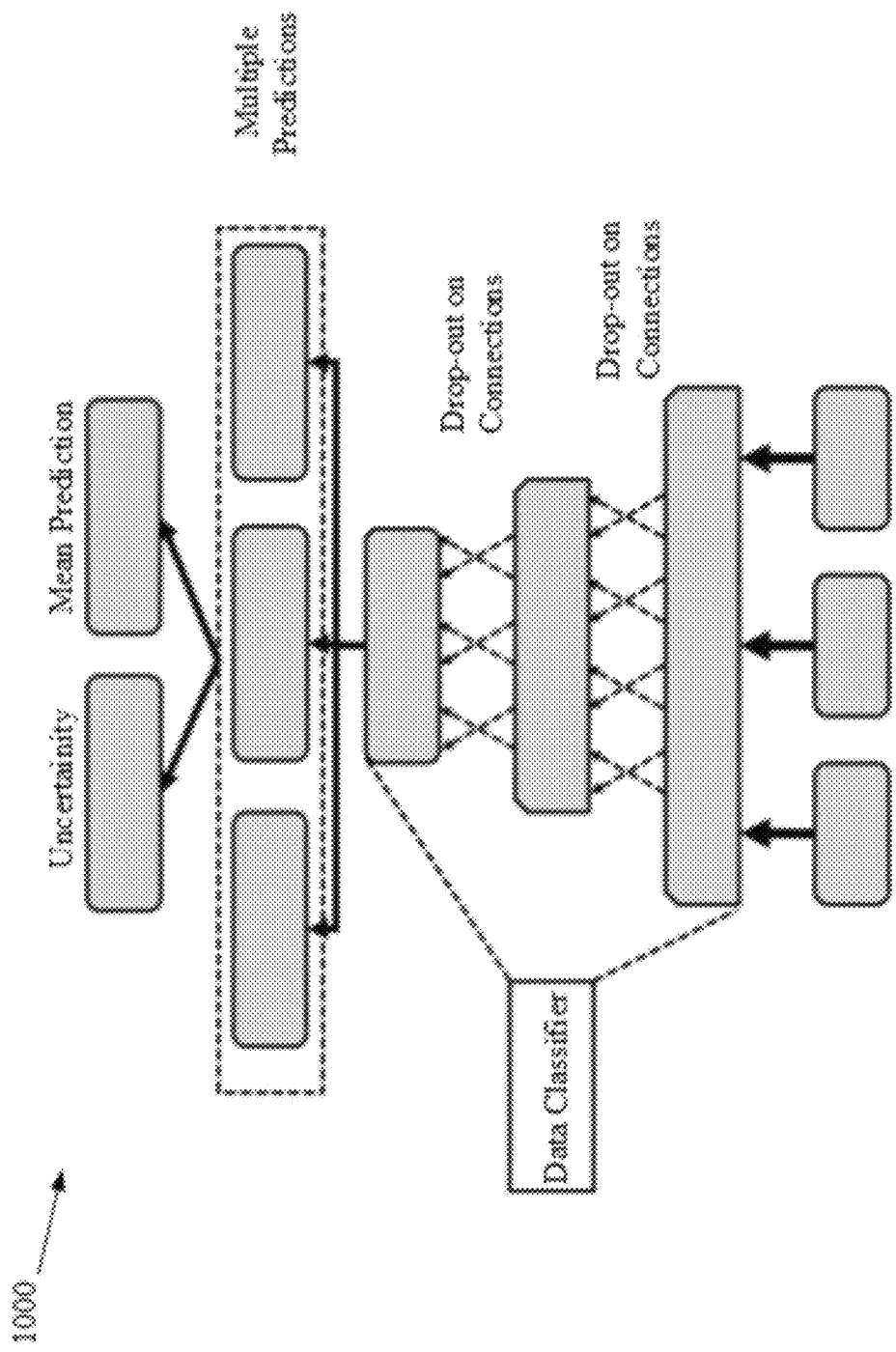
FIG. 10 shows data flow diagram of dropout in a data classifier in accordance with an embodiment of the invention.

In an embodiment, L4 labels for spend data can be large (about 15000) and it is crucial to get the model confidence of classification. Traditional deep neural networks are trained under a maximum likelihood framework and do not provide a confidence score. To address this problem, dropout in the model is used as a Bayesian approximation. By using dropout during model inference with multiple runs through the network, the variance in the estimates of the model can be used as a measure of uncertainty in the model. Samples with low confidence are marked by the system for inspection and correction. An overview of using dropout is shown by flow diagram 1000 in FIG. 10.

Figure 11:
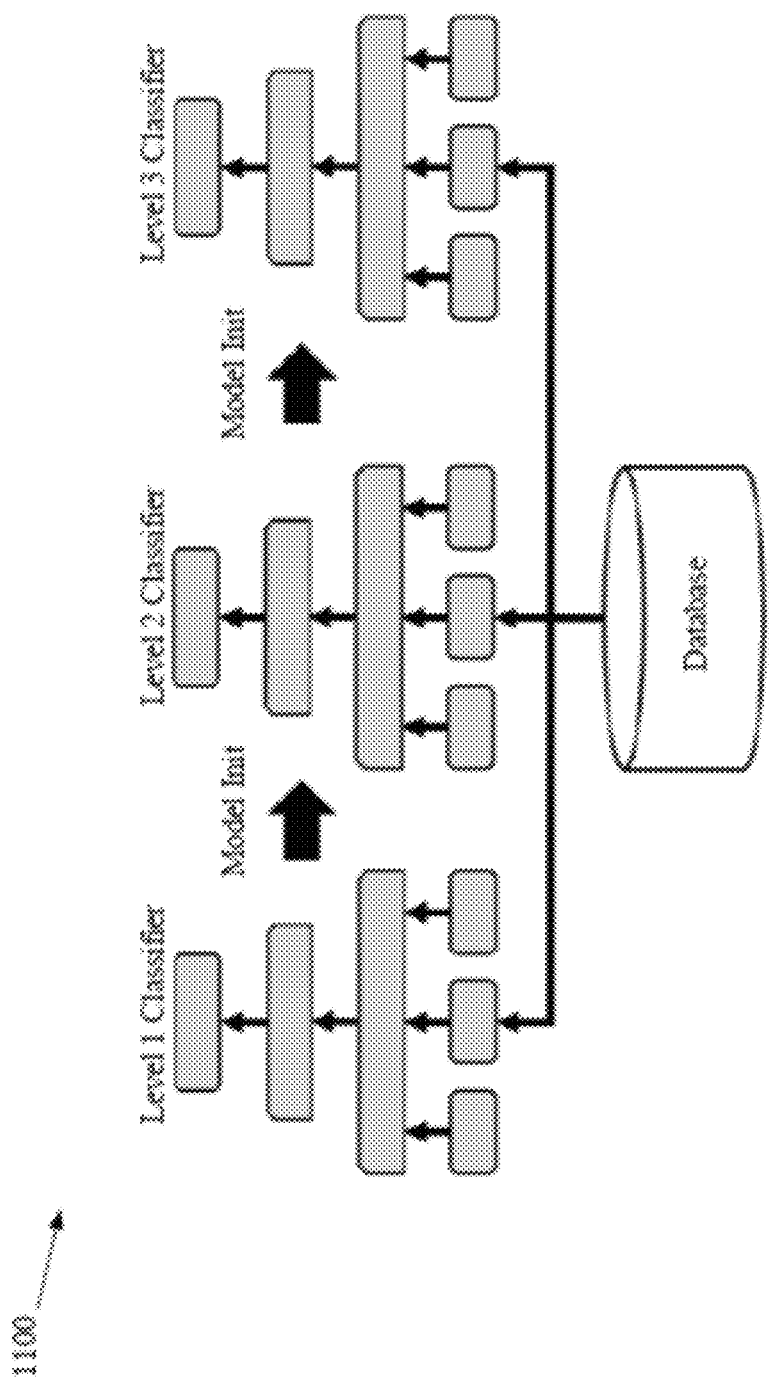
FIG. 11 shows hierarchical structure for fine-tuning of data classifier in accordance with an embodiment of the invention.

In an embodiment, the spend label taxonomy has 4 levels with an increasing granularity going from L1 to L4. Training a classifier for L4 independently could result in poor performance especially for many categories. To overcome this problem, the feature space of an L4 classifier is gradually finetuned in a hierarchical manner starting from L1. This implies that the model initialization for L2 classifier is done using the model parameters of a trained L1 classifier and so on until L4. This ensures that the discriminative features of a higher-level classifier are inherited by the classifier at a lower level. A block diagram 1100 of performing hierarchical finetuning is shown in FIG. 11.

In an embodiment, the dataset used for the data classification comprises of several entities having individual characteristics. These individual characteristics are explicitly handled by performing model agnostic meta learning through blockchain based implementation. This involves alternating between gradient descent using samples from each entity at a time and a meta update by aggregating the losses across multiple entities as shown below:

$$\theta'_i = \theta - \alpha \nabla \mathcal{L}_{C_i}(f_\theta)$$

$$\theta \leftarrow \theta - \beta \nabla_\theta \sum_{C_i}(f_{\theta'_i})$$

Figure 12:
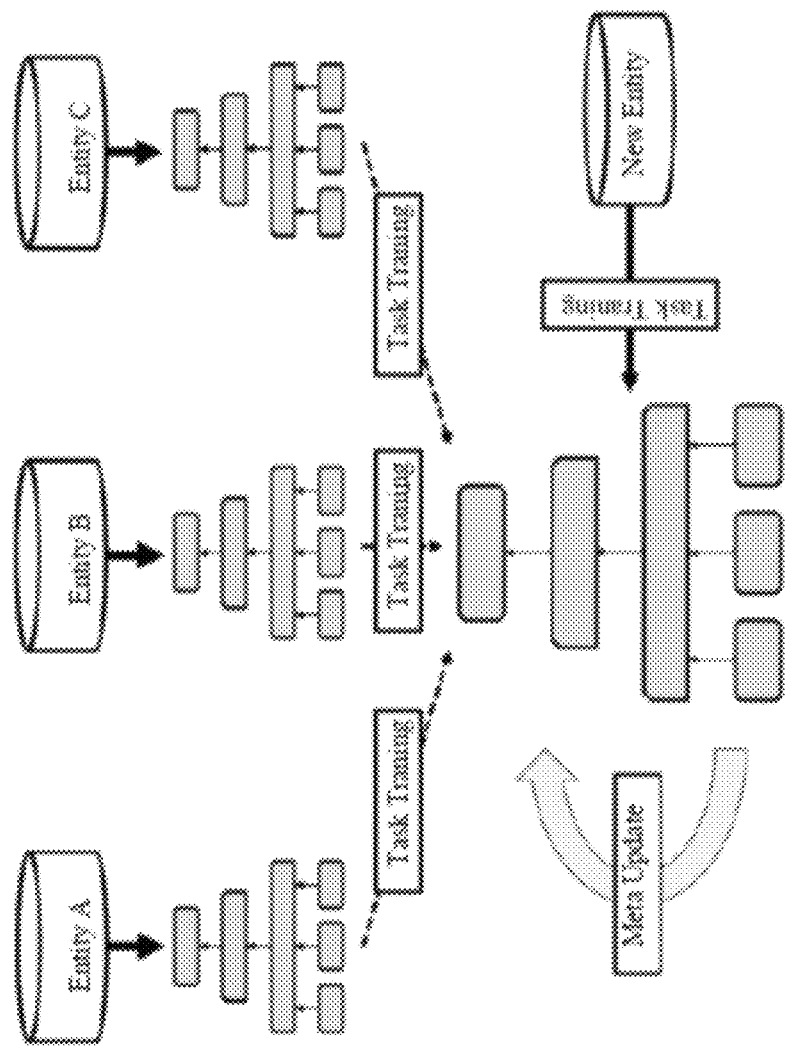
FIG. 12 shows a data structure with meta-learning for data by treating each entity as a separate task in accordance with an embodiment of the invention.

The learning rates $\alpha, \beta$ are for the entity-specific ($C_i$) update and meta update respectively and $f_\theta$ is the classifier being trained. This has been shown to perform better and achieve comparable accuracy with smaller datasets. This training methodology is applied for training an industry-specific model and adapted to a new entity for the coldstart classification problem. The flow diagram 1200 depicting meta-learning on the entity data is shown in FIG. 12.

In an embodiment data like spend data has generally Vendor Name, Invoice line description, purchase order description, material description, general ledger account information and spend values. These are the fields based upon which a data analyst classifies a transaction into one of the pre-defined Category. The categories (a.k.a. taxonomy) are decided in advanced. The vendor name is, however, very loosely related to taxonomy of classification and similarly the transaction description fields are also very less informative on their own to classify a transaction into a specific taxonomy.

In an exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A method of data processing and classification comprises:
  receiving data from an entity at a server;
  cleansing and enriching the data and storing the cleansed enriched data in an operational database;
  determining whether the cleansed enriched data is a new entity data type and, in response to the determination of the cleansed enriched data as a new entity data, initiating a stratified sampling of the cleansed enriched data for obtaining at least one data subset from the cleansed enriched data;
  generating reference data from the at least one data subset by annotation through an Artificial Intelligence engine coupled to a processor, wherein an annotation script configured to process the at least one data subset generates the reference data based on a dynamic processing logic;
  training an entity specific data model by applying transfer learning to a historical data model using the reference data;
  creating a classification data matrix from the cleansed enriched data;
  creating classified data by classifying the cleansed enriched data, wherein the cleansed and enriched data is classified by applying the entity specific data model to the classification data matrix; and
  providing a confidence score of the classified data, wherein the dynamic processing logic integrates deep learning, predictive analysis, information extraction, optimization and bots for processing the at east one data subset and wherein the annotation script is created by the bots based on the at least one data subset and the cleansed enriched data stored in the operational database.

2. The method of claim 1, wherein the historical data model is trained by pooling a plurality of distinct entity data as training data and the historical data model is used as an initialization for training the entity specific data model on receiving the cleansed enriched data of the new entity.

3. The method of claim 2, wherein the historical data model is trained through meta-learning as the training of the historical model alternates between an entity specific training model and a meta update model in direction of plurality of entities to ensure efficient training in a low-data regime of performing data classification for a new entity.

4. The method of claim 3, wherein the training of the historical model based on alternating between the entity specific training model and the meta update model for the plurality of entities includes aggregating losses across the plurality of entities as:

$$\theta'_i = \theta - \alpha \nabla \mathcal{L}_{\mathcal{C}_i}(f_\theta)$$

$$\theta \leftarrow \theta - \beta \nabla_\theta \sum \mathcal{L}_{\mathcal{C}_i}(f_{\theta'_i})$$

where, α, is learning rate for entity specific (G) training model;
  β is learning rate for meta update model;
  and $f_\theta$ is a classifier being trained for the historical model.

5. The method of claim 1, wherein the confidence score is determined by using dropout in the entity specific data model as an approximation for variational inference to predict sample mean prediction and an uncertainty estimate.

6. The method of claim 1, wherein the cleansed enriched data is encoded into vectors by passing through an embedding layer to obtain embedded vectors, wherein the embedded vectors are passed through convolutional filters and max pooling layers to obtain dense vectors that are used to obtain a probability distribution over target labels by passing through a soft-max layer.

7. The method of claim 1, wherein the step of cleansing and enriching the received data includes:
  determining a characteristic of the data received from the entity and verifying a historical database for identifying at least one related data for the data received from the entity;
  in response to identification of the at least one related data, determining if the at least one related data is a cleansed data, wherein the data received from the entity is recharacterized based on the at least one related data if the at least one related data is a cleansed data thereby cleansing the data received from the entity;
  initiating a data cleansing and normalization operation on an identified dataset if the at least one related data is not a cleansed data, wherein the identified dataset includes the at least one related data of the historical database and the data received from the entity;
  in response to initiation of the data cleansing and normalization operation, identifying a plurality of data cleansing models from a data cleansing model database for cleansing of the identified dataset; and
  creating at least one data model switching script by a bot based on the identified dataset, the identified data cleansing models, and AI based processing logic for cleansing of the received data.

8. The method of claim 7, wherein the at least one data model switching script is configured to recharacterize the identified dataset and recalibrate a plurality of functions of at least one application deploying the recharacterized dataset.

9. The method of claim 7, wherein the data received from the entity is added to a graph database for identifying the at least one related data, wherein a connection of the data received from the entity with the at least one related data in the historical database is formed if a node in the graph database with values similar to the data received from the entity is present else a new node for the data received from the entity is formed.

10. The method of claim 9, wherein the graph database enables comparison of the data received from the entity with the at least one related data to which the data received from the entity is connected through a property/relation, wherein a similarity score is computed between the data received from the entity and the at least one related data.

11. The method of claim 10, wherein the graph database is configured to store graph structures for semantic queries with nodes, edges and properties to represent and store data.

12. The method of claim 7, wherein the data received from the entity is an item data, supplier data or a data string extracted from at least one data source.

13. The method of claim 1, wherein the data received from the entity is extracted from a data object by a data extraction method, wherein the data extraction method comprises:
identifying a type of data object;
sending the data object to at least one data recognition training model for identification of at least one object proposal, wherein the data recognition training model processes the data object based on prediction analysis by a bot for obtaining the at least one object proposal with a confidence score;
cropping the at least one object proposal;
extracting text data from the at least one object proposal by optical character recognition; and
validating the text data after processing through an AI based data validation engine.

14. The method of claim 13 further comprising the step of:
determining if the extracted data relates to an existing entity; and
identifying data attributes associated with the data object received from the existing entity based on at least one region of interest script, wherein the region of interest script is generated by the bot based on processing of a historical database of the identified existing entity.

15. The method of claim 13 further comprising:
determining if the extracted data relates to a new entity;
extracting data attributes from the data object through optical character recognition; and
storing the extracted data attributes and coordinates of the data attributes with respect to the new entity in a database.

16. The method of claim 13, wherein the data object is a JPG file, or a PDF file converted to a JPG file.

17. The method of claim 16, wherein the at least one object proposal is an image of a logo, monogram or an entity recognition image.

18. The method of claim 13, wherein the data received from the entity is obtained from specification data of MRO parts in an image.

19. The method of claim 13, further comprising: adding the entity as a new block of a blockchain network, wherein the blockchain network includes a plurality of linked data blocks with multiple branches configured to store data from distinct entities.

20. A data processing and classification system comprising:
at least one server configured to receive data from an entity;
at least one data store having a plurality of databases including an operational database for storing the data received from the entity after cleansing and enrichment of the data received from the entity, and at least one training model database for storing a historical data classification model;
a verification engine for checking if the data received from the entity is a new entity data; and
a processor configured to select a data classification tool for generating classified data with a confidence score in response to determination of the cleansed enriched data as a new entity data, wherein the data classification tool is configured to:
initiate a stratified sampling of the cleansed enriched data for obtaining at least one data subset from the cleansed enriched data;
generate a reference data from the at least one data subset by annotation through an Artificial Intelligence engine, wherein an annotation script is configured to process the at least one data subset and generate the reference data based on a dynamic processing logic; and
train an entity specific data model by applying transfer learning to a historical data model using the reference data, wherein the Artificial Intelligence engine is configured to create a data matrix from the cleansed enriched data, and the entity specific data model is applied to the data matrix for classifying the cleansed enriched data and provide the confidence score of the classified data, wherein the dynamic processing logic integrates deep learning, predictive analysis, information extraction, optimization and bots for processing the at least one data subset and wherein the annotation script is created by the bots based on the at least one data subset and the cleansed enriched data stored in the operational database.

21. The system of claim 20, wherein the dynamic processing logic integrates deep learning, predictive analysis, information extraction, optimization and bots for processing the at least one data subset.

22. The system of claim 20, wherein the data received from the entity is encoded into vectors by passing through an embedding layer to obtain embedded vectors, wherein the embedded vectors are passed through convolutional filters and max pooling layers to obtain dense vectors that are used to obtain a probability distribution over target labels by passing through a soft-max layer.

23. The system of claim 20, wherein for data cleansing and enrichment the system further comprises:
a related data verification engine configured to determine characteristics of the data received from the entity and verify a historical database for identifying at least one related data for the data received from the entity based on the characteristics;
a sub-processor configured to process the data received from the entity, the identified related data for determining if the related data is a cleansed data and recharacterize the data received from the entity based on the related data;
a controller encoded with instructions enabling the controller to function as a bot for initiating a data cleansing and normalization operation on an identified dataset if the related data is not a cleansed data, wherein the identified dataset includes the at least one related data of the historical database and the received data; and
a cleansing data model database for storing a plurality of data models configured to clean the identified dataset, wherein at least one data model switching script is created by the bot based on the identified dataset, the plurality of data models and AI based processing logic for cleansing of the identified dataset wherein the data model switching script is configured to recharacterize the identified dataset and re-calibrate a plurality of functions of at least one application deploying the recharacterized dataset.

24. The system of claim 23, further comprising: a graph database configured to store graph structures for semantic queries with nodes, edges and properties to represent and store data.

25. The system of claim 24, wherein the graph database includes nodal connections of similar data values wherein the received data is added to the graph database for identifying the related data wherein a connection of the received data with the related data in the historical database is formed if a node in the graphical database with values similar to the received data is present else a new node for the received data is formed.

26. The system of claim 25, wherein the graph database enables comparison of the data received from the entity with only related data to which the data received from the entity is connected through a property/relation, wherein a similarity score is computed between the data received from the entity and the related data.

27. The system of claim 23, wherein the data received from the entity is a supplier data, item data or a data string extracted from at least one data source.

28. The system of claim 23, further comprising: a data extracting and mapping module with optical character recognition and an Artificial Intelligence engine configured to process a data object to extract at least one data proposal wherein the extracted data proposal is mapped with an entity historical database for validation.

29. The system of claim 28, further comprising: a region of interest script configured to identify data attributes associated with the data object, wherein the region of interest script draws bounded box around the data attributes of the data object before cropping the data attributes in the drawn box and converting the data attributes to text for data extraction.

30. The system of claim 28, wherein the data attributes include an address, a line item in an invoice, or a Partner name.

31. The system of claim 23, wherein the data received from the entity is obtained from specification data of MRO parts in an image.

32. The system of claim 20, further comprising:
a plurality of linked data blocks forming a blockchain with multiple branches configured to store data from distinct entities;
an AI based processing node configured to store a dynamically updated blockchain based historical data model, wherein the historical data model is reconfigured each time a data learning is transferred to the historical data model from a sub-data model of each of the plurality of linked data blocks; and
an element connected to each of the linked data block configured to receive the dynamically updated blockchain based historical data model for cleansing and enrichment of the stored data in each of the linked data blocks.

33. A computer program product for data processing and classification, the product comprising:
a computer readable storage medium readable by a processor for performing a method, the method comprising
receiving data from an entity at a server;
cleansing and enriching the data received at the server and storing the cleansed enriched data in an operational database;
determining whether the cleansed and enriched data is new entity data and in response to determining the cleansed enriched data is new entity data, initiating a stratified sampling of the cleansed enriched data for obtaining at least one data subset from the enriched data;
generating a reference data from the at least one data subset by annotation through an Artificial Intelligence engine coupled to a processor, wherein an annotation script configured to process the at least one data subset generates the reference data based on a dynamic processing logic;
training an entity specific data model by applying transfer learning to a historical data model using the reference data;
creating a classification data matrix from the cleansed enriched data, and
applying the entity specific data model to the classification data matrix for classifying the cleansed enriched data and providing a confidence score of the classified data, wherein the dynamic processing logic integrates deep learning, predictive analysis, information extraction, optimization and bots for processing the at least one data subset and wherein the annotation script is created by the bots based on the at least one data subset and the cleansed enriched data stored in the operational database.

* * * * *